(12) United States Patent
Ninomiya et al.

(10) Patent No.: US 12,474,354 B2
(45) Date of Patent: Nov. 18, 2025

(54) DISEASE RISK ASSESSMENT APPARATUS, DISEASE RISK ASSESSMENT METHOD, COMPUTER READABLE MEDIUM, AND FOOD FOR DEMENTIA PREVENTION

(71) Applicants: Kyushu University, National University Corporation, Fukuoka (JP); Kurume Research Park Co., Ltd., Kurume (JP)

(72) Inventors: Toshiharu Ninomiya, Fukuoka (JP); Yoshinori Katakura, Fukuoka (JP); Satoru Kuhara, Fukuoka (JP); Jun Hata, Fukuoka (JP); Kazuhiro Fujita, Kurume (JP)

(73) Assignees: Kyushu University, National University Corporation (JP); Kurume Research Park Co., Ltd. (JP)

( * ) Notice: Subject to any disclaimer, the term of this patent is extended or adjusted under 35 U.S.C. 154(b) by 1153 days.

(21) Appl. No.: 16/642,126

(22) PCT Filed: Oct. 29, 2019

(86) PCT No.: PCT/JP2019/042259
§ 371 (c)(1),
(2) Date: Feb. 26, 2020

(87) PCT Pub. No.: WO2020/090774
PCT Pub. Date: May 7, 2020

(65) Prior Publication Data
US 2021/0148938 A1    May 20, 2021

(30) Foreign Application Priority Data
Oct. 30, 2018    (JP) .................................. 2018-203803

(51) Int. Cl.
*G01N 33/68* (2006.01)
*A23L 33/00* (2016.01)
(Continued)

(52) U.S. Cl.
CPC ........ *G01N 33/6896* (2013.01); *A23L 33/175* (2016.08); *A23L 33/40* (2016.08);
(Continued)

(58) Field of Classification Search
CPC ....... G01N 33/6896; G01N 2800/2814; G01N 2800/2821; G01N 2800/50; A23L 33/175; G16H 50/20; A61B 5/4088
See application file for complete search history.

(56) References Cited

U.S. PATENT DOCUMENTS

| 2004/0265358 | A1* | 12/2004 | Verhoef ................. A23L 15/30 426/53 |
| 2005/0191685 | A1 | 9/2005 | Vanmechelen et al. |

(Continued)

FOREIGN PATENT DOCUMENTS

| GB | 2394770 A | * 5/2004 | ......... G01N 33/6812 |
| JP | 2007-528219 A | 10/2007 | |

(Continued)

OTHER PUBLICATIONS

WO2018008764_A1_translated (Year: 2018).*
(Continued)

*Primary Examiner* — Elizabeth A Robinson
*Assistant Examiner* — Tingchen Shi
(74) *Attorney, Agent, or Firm* — MASCHOFF BRENNAN

(57) ABSTRACT

A disease risk assessment apparatus (100) includes an assessment unit (1) for assessing the risk of developing dementia in a subject, based on the concentration of an amino acid in the blood of the subject. The amino acid
(Continued)

includes at least one selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine.

6 Claims, 4 Drawing Sheets

(51) Int. Cl.
  *A23L 33/175* (2016.01)
  *G16H 50/00* (2018.01)
  *G16H 50/20* (2018.01)
  *A61B 5/00* (2006.01)

(52) U.S. Cl.
  CPC ............ *G16H 50/00* (2018.01); *G16H 50/20* (2018.01); *A23V 2002/00* (2013.01); *A61B 5/4088* (2013.01); *G01N 2800/2814* (2013.01); *G01N 2800/2821* (2013.01); *G01N 2800/50* (2013.01)

(56) References Cited

U.S. PATENT DOCUMENTS

| | | |
|---|---|---|
| 2008/0261889 A1 | 10/2008 | Vanmechelen |
| 2012/0208185 A1 | 8/2012 | Van Mechelen et al. |
| 2014/0165700 A1 | 6/2014 | Oresic et al. |
| 2014/0357525 A1 | 12/2014 | Kaddurah-Daouk et al. |
| 2016/0195547 A1 | 7/2016 | Cohn et al. |
| 2017/0242040 A1 | 8/2017 | Zanotti et al. |
| 2018/0104294 A1* | 4/2018 | Vuckovic ............... A23L 33/105 |
| 2019/0137516 A1 | 5/2019 | Keuchi et al. |

FOREIGN PATENT DOCUMENTS

| | | | |
|---|---|---|---|
| JP | 2011-242217 A | 12/2011 | |
| JP | 2014-521928 A | 8/2014 | |
| JP | 2018-021919 A | 2/2018 | |
| JP | 2018118914 A | 8/2018 | |
| WO | 2010/066000 A1 | 6/2010 | |
| WO | 2013/080265 A1 | 6/2013 | |
| WO | WO-2013093079 A1 * | 6/2013 | ......... A61K 31/4415 |
| WO | 2015060317 A1 | 4/2015 | |
| WO | WO-2018008763 A1 * | 1/2018 | ....... G01N 33/48792 |
| WO | WO-2018008764 A1 * | 1/2018 | ......... G01N 33/6896 |
| WO | 2018047980 A1 | 3/2018 | |

OTHER PUBLICATIONS

WO2018008763_A1_translate (Year: 2018).*
Tynkkynen Juho et al., Association of branched chain amino acids and other circulating metabolites with risk of incident dementia and Alzheimer's disease: A prospective study in eight cohorts, Alzheimer's & Dementia, Jun. 1, 2018, vol. 14, pp. 723-733.
Wald David S. et al., Serum homocysteine and dementia: Meta-analysis of eight cohort studies including 8669 participants, Alzheimer's & Dementia, 2011, vol. 7, pp. 412-417.
Zhou Futao, Chen Shuangrong, Hyperhomocysteinemia and risk of incident cognitive outcomes: An updated dose-response meta-analysis of prospective cohort studies, Ageing Research Reviews, Feb. 28, 2019, vol. 51, pp. 55-66.
Graham Stewart F. et al., Untargeted Metabolomic Analysis of Human Plasma Indicates Differentially Affected Polyamine and L-Arginine Metabolism in Mild Cognitive Impairment Subjects Converting to Alzheimer's Disease, PLOS One, Mar. 24, 2015, vol. 10, No. 3, e.0119452.
International Search Report issued on Jan. 28, 2020 by the international search authority in connection with PCT/JP2019/042259.
Written Opinion issued on Jan. 28, 2020 by the international search authority in connection with PCT/JP2019/042259.
Office Action dated May 11, 2021, issued by Japan Patent Office for the corresponding JP patent application No. 2020-511409.
The Office Action issued by the China National Intellectual Property Administration (CNIPA) dated Oct. 25, 2022 for the Chinese Patent Application No. 201980003868.8.
"Communication Rule 164(1) EPC, European Patent Application 19850719.6", Feb. 2, 2022, 18 pages.
Bressler, B. Yu , et al., "Metabolomics and cognition in African American adults in midlife: the atherosclerosis risk in communities study", Translational Psychiatry, vol. 7, No. 7, Jul. 1, 2017, pp. e1173-e1173.
Ibanez, Clara , et al., "Toward a Predictive Model of Alzheimer's Disease Progression Using Capillary Electrophoresis-Mass Spectrometry Metabolomics", Analytical Chemisty, 2012, pp. 8532-08540.
"Extended Search Report, European Patent Application 19850719.6", Jun. 21, 2022, 20 pages.
Bottiglieri, T. , et al., "Cerebrospinal Fluis S-Adenosylmethionine in Depression and Dementia: Effects of Treatment With Parenteral and Oral S-Adenosylmethionine", Journal of Neurology Neurosurgery & Psychiatry, BMJ Publishing Group, GB, vol. 53, No. 12., Dec. 1, 1990, pp. 1096-1098.
Chang, Po-Yuan , et al., "S-Adenosylhomocysteine: A Better Marker of the Development of Alzheimer's Disease than Homocysteine?", Journal of Alzheimer's Disease, vol. 21, No. 1., Jul. 8, 2010, pp. 65-66.
Ravaglia, Giovanni , et al., "Homocysteine and folate as risk factors for dementia and Alzheimer disease", American Journal of Clinical Nutrition, vol. 82, No. 3., Sep. 1, 2005, pp. 636-643.
Sorolla, M. Alba, et al., "Impaired PLP-dependent metabolism in brain samples from Huntington disease patients and transgenic R6/1 mice", Metabolic Brain Disease, Kluwer Academic-Plenum Publishers, New York, NY, US, vol. 31, No. 3., Dec. 14, 2015, pp. 579-586.

\* cited by examiner

FIG.3

|  | Amino acid score | | | | | | Presence or absence of dementia |
|---|---|---|---|---|---|---|---|
|  | Met | Thr | His | Ile | .... | Asn | |
| Subject a | $C_{a1}$ | $C_{a2}$ | $C_{a3}$ | $C_{a4}$ | .... | $C_{a5}$ | 0 |
| Subject b | $C_{b1}$ | $C_{b2}$ | $C_{b3}$ | $C_{b4}$ | .... | $C_{b5}$ | 1 |
| Subject c | : | : | : | : | .... | : | 0 |
| Subject d | : | : | : | : | .... | : | 0 |
| Subject e | : | : | : | : | .... | : | 2 |

DISEASE RISK ASSESSMENT APPARATUS, DISEASE RISK ASSESSMENT METHOD, COMPUTER READABLE MEDIUM, AND FOOD FOR DEMENTIA PREVENTION

PRIORITY CLAIM

This is a U.S. national stage of application No. PCT/JP2019/042259, filed on Oct. 29, 2019. Priority is claimed on the following applications: Country: Japan, Application No.: 2018-203803, Filed: Oct. 30, 2018, the content of which is incorporated here by reference.

TECHNICAL FIELD

The present disclosure relates to a disease risk assessment apparatus, a disease risk assessment method, a computer readable medium, and a food for dementia prevention.

BACKGROUND ART

Dementia is one of the leading causes of disability and death for the elderly. Medical and economic burdens of dementia on society are serious problems. In order to reduce the medical and economic burdens, methods for assessing or predicting the risk of developing dementia before the development of dementia have been investigated.

For example, Patent Literature 1 has disclosed a method for determining the risk of developing neurological diseases such as Alzheimer-type dementia in a subject, the method including detecting the presence of a mutation in the MBL gene in the subject.

Instead of the method for assessing or predicting the risk of developing dementia, Patent Literature 2 has disclosed a method for assessing whether a subject has cerebrovascular accident using an index value for assessing the state of cerebrovascular accident obtained based on the concentration of a certain amino acid in the blood of the subject. The index for assessing the state of cerebrovascular accident is calculated by a discriminant constructed in a multivariate statistical analysis using the concentrations of the amino acid in a healthy subject and a subject already suffered from cerebrovascular accident.

CITATION LIST

Patent Literature

Patent Literature 1: National Patent Publication No. 2007-528219
Patent Literature 2: Unexamined Japanese Patent Application Kokai Publication No. 2018-021919

SUMMARY OF INVENTION

Technical Problem

The method disclosed in Patent Literature 1 requires amplifying and sequencing a nucleic acid obtained from a subject in order to detect the presence or absence of a mutation in the MBL gene in the subject. Disadvantageously, the series of operations for determining the nucleotide sequence is relatively complicated.

In the method disclosed in Patent Literature 2, a discriminant is constructed based on the concentration of an amino acid in a patient already with cerebrovascular accident. The concentration of the amino acid in the blood of the patient already with a cerebrovascular accident may have been affected by the development of cerebrovascular accident. Thus, the method is not suitable as a method for assessing the future disease risk in a subject who has not developed cerebrovascular accident. Even when the method disclosed in Patent Literature 2 is applied to the assessment of the risk of developing dementia, the risk of developing dementia cannot be assessed with high accuracy.

In view of the above circumstances, an object of the present disclosure is to provide a disease risk assessment apparatus, a disease risk assessment method, and a computer readable medium that are capable of assessing the risk of developing dementia easily and with high accuracy, as well as a food for dementia prevention that is capable of preventing dementia.

Solution to Problem

The present inventor has intensively studied the results of prospective cohort studies to find that there is a significant difference in the concentration of a certain amino acid in the blood between a subject who will develop dementia and a subject who will not develop dementia in the future, thereby completing the present disclosure.

In a first aspect of the present disclosure, there is provided a disease risk assessment apparatus, including:
  an assessment unit for assessing risk of developing dementia in a subject, based on a concentration of an amino acid in blood of the subject,
  wherein the amino acid includes at least one selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine.

In an embodiment of the first aspect, the assessment unit may assess risk of developing dementia or Alzheimer-type dementia in a subject, based on concentrations of methionine and threonine in blood of the subject.

In another embodiment, the assessment unit may assess risk of developing Alzheimer-type dementia or vascular dementia in a subject, based on concentrations of histidine, phenylalanine, leucine, isoleucine, methionine, threonine, lysine, valine, and tryptophan in blood of the subject.

In another embodiment, the assessment unit may assess risk of developing Alzheimer-type dementia or vascular dementia in a subject, based on concentrations of histidine, isoleucine, methionine, lysine, asparagine and tryptophan in blood of the subject.

In another embodiment, the assessment unit may assess risk of developing Alzheimer-type dementia or vascular dementia in a subject, based on concentrations of histidine, isoleucine, methionine, lysine, asparagine, glutamine, and tryptophan in blood of the subject.

In another embodiment, the assessment unit may assess risk of developing Alzheimer-type dementia or vascular dementia in a subject, based on concentrations of isoleucine, glutamine, and lysine in blood of the subject.

In another embodiment, the assessment unit may assess risk of developing dementia in a subject, based on a concentration ratio between methionine and homocysteine in blood of the subject.

In another embodiment, the assessment unit may assess risk of developing dementia, Alzheimer-type dementia, or vascular dementia in a subject, based on a concentration ratio between S-adenosylmethionine and S-adenosylhomocysteine in blood of the subject.

In another embodiment, the assessment unit may assess the risk of developing dementia in the subject within five years after collection of the blood.

In a second aspect of the present disclosure, there is provided a disease risk assessment method, including:
  a step of assessing risk of developing dementia in a subject, based on a concentration of an amino acid in blood of the subject,
  wherein the amino acid includes at least one selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine.

In a third aspect of the present disclosure, there is provided a non-transitory computer readable medium storing a program for causing a computer to function as an assessment unit for assessing risk of developing dementia in a subject, based on a concentration of an amino acid in blood of the subject,
  wherein the amino acid includes at least one selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine.

In a fourth aspect of the present disclosure, there is provided a food for dementia prevention containing at least one selected from the group consisting of histidine, methionine, threonine, glutamine, and S-adenosylmethionine.

Advantageous Effects of Invention

The present disclosure can assess the risk of developing dementia with ease and high accuracy. The present disclosure can also prevent dementia.

BRIEF DESCRIPTION OF DRAWINGS

FIG. 3 is a table illustrating training data used for constructing a model for assessing the risk of developing dementia.

DESCRIPTION OF EMBODIMENTS

Embodiments of the present disclosure will be described with reference to drawings. The present disclosure, however, is not limited to the following embodiments.

Embodiment 1

Figure 1A:
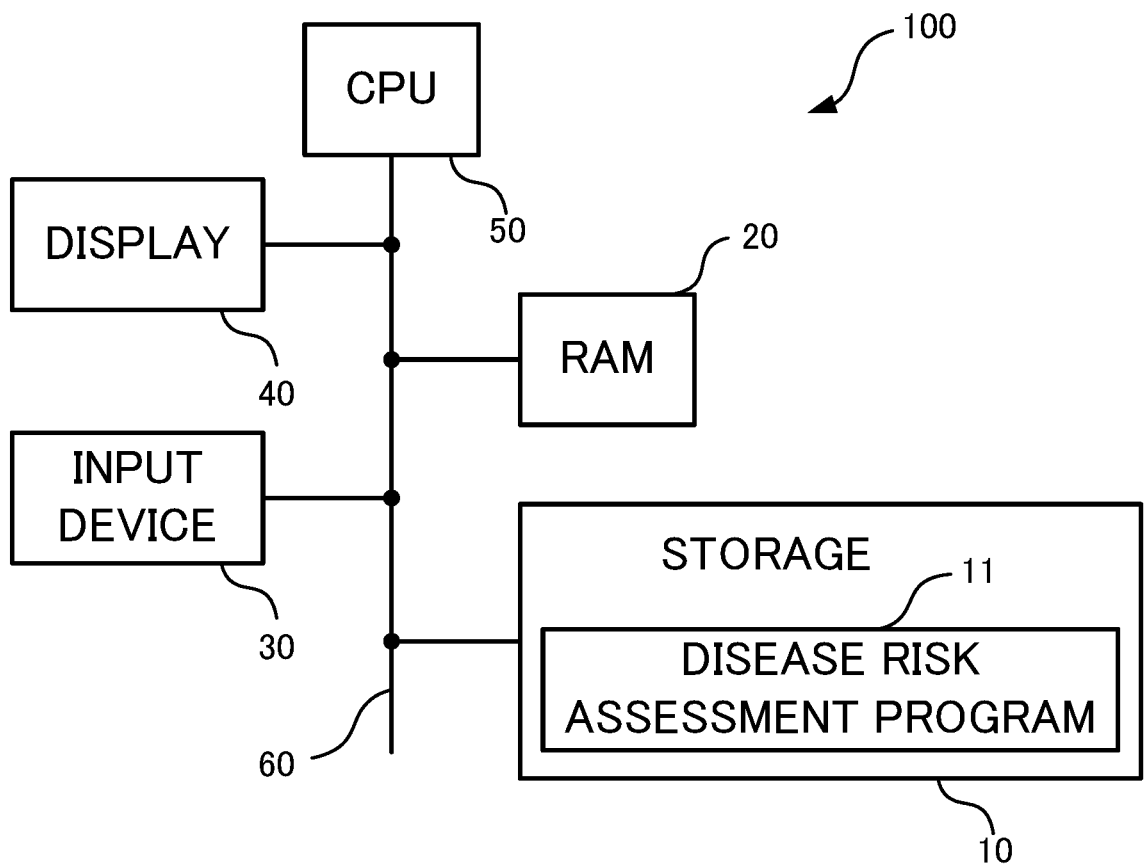
FIG. 1A is a block diagram showing hardware components of a disease risk assessment apparatus according to Embodiment 1 of the present disclosure.

A disease risk assessment apparatus 100 according to Embodiment 1 will be described with reference to FIG. 1. The disease risk assessment apparatus 100 is an apparatus for assessing the risk of developing dementia in a subject. As shown in FIG. 1A, the disease risk assessment apparatus 100 includes a storage 10, a random access memory (RAM) 20, an input device 30, a display 40, and a central processing unit (CPU) 50 that are connected to each other via a bus 60.

The storage 10 includes a nonvolatile storage medium, such as a read only memory (ROM), a hard disk drive (HDD), or a flash memory. The storage 10 stores a disease risk assessment program 11 as well as various data and software programs.

The RAM 20 functions as a main memory of the CPU 50. The disease risk assessment program 11 is loaded into the RAM 20 upon implementation of the disease risk assessment program 11 by the CPU 50. The RAM 20 temporarily stores data input from the input device 30.

The input device 30 is a hardware with which a user inputs data to the disease risk assessment apparatus 100. Using the input device 30, information about the concentration of an amino acid in the blood of a subject is input to the CPU 50. The CPU 50 stores the information about the concentration of an amino acid in the blood of a subject in the storage 10.

The subject is an animal, preferably a human. When the subject is a human, the subject is preferably the elderly, for example, aged 50 years and above, more preferably aged 60 years and above. The information about the concentration of an amino acid in a blood is a concentration value of an amino acid in, for example, blood, plasma, or serum. The present embodiment uses the concentration of an amino acid in serum as the concentration of an amino acid in blood. As used in the present embodiment, the term "amino acid" means an organic compound having both functional groups, an amino group and a carboxyl group.

Plasma and serum can be obtained by known methods. For example, plasma can be collected as a liquid component obtained by mixing a blood of a subject and an anticoagulant, and centrifuging the mixture. Serum can be collected as a supernatant obtained by leaving a blood of a subject to stand without mixing with an anticoagulant until clots coagulate, and then centrifuging it.

The concentration of an amino acid in serum of a subject can be measured by a known method. Preferably, the concentration of an amino acid is measured by using a liquid chromatograph mass spectrometer (LC/MS), a liquid chromatograph-tandem mass spectrometer (LC-MS/MS), or the like.

The display 40 is a display to which a result for the disease risk assessment by the CPU 50 is output.

The CPU 50 loads the disease risk assessment program 11 stored in the storage 10 into the RAM 20 and executes the disease risk assessment program 11 to implement functions described below.

Figure 1B:
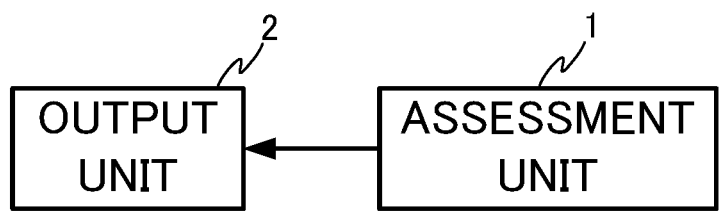
FIG. 1B is a block diagram showing a function of the disease risk assessment apparatus.

FIG. 1B is a block diagram showing the functions implemented by the CPU 50. The disease risk assessment program 11 allows the CPU 50 to implement the functions as an assessment unit 1 and an output unit 2. In the following description, information about the concentration of an amino acid in serum of a subject is considered as "concentration data".

The assessment unit 1 assesses the risk of developing dementia in a subject based on the concentration of an amino acid in serum of the subject. As demonstrated in Examples 1 and 2 below, the concentration of a certain amino acid in serum relate is related to the risk of developing dementia. Specifically, a subject with a lower concentration of methionine, threonine, or S-adenosylmethionine in serum has a higher risk of developing dementia than a subject with a higher concentration. Further, a subject with a higher concentration of homocysteine or cystathionine has a higher disease risk than a subject with a lower concentration.

As only for Alzheimer-type dementia, a subject with a lower concentration of histidine, isoleucine, methionine, threonine, glutamine, lysine, or S-adenosylmethionine has a higher disease risk than a subject with a higher concentration. On the other hand, as only for vascular dementia, a subject with higher concentrations of phenylalanine, leucine, isoleucine, glycine, lysine, asparagine, homocysteine, cystathionine, and S-adenosylhomocysteine has a higher disease risk than a subject with lower concentrations.

Thus, the assessment unit 1 assesses the risk of developing dementia in a subject, based on the concentration of an amino acid in the serum of the subject, the amino acid including at least one selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine.

When assessing the risk of developing a dementia in a subject using one of the amino acids described above, for example, the assessment unit 1 compares the concentration of the amino acid to the reference value to assess the risk of developing dementia. Specifically, for example, when the concentration of methionine in the serum of a subject is lower than the reference value, the assessment unit 1 assesses the risk of developing dementia as high. The assessment unit 1 may assess the risk of developing dementia in a subject in the same manner based on the concentration of threonine.

When the concentration of histidine in the serum of a subject is lower than the reference value, the assessment unit 1 may assess the risk of developing Alzheimer-type dementia as high. The assessment unit 1 may assess the risk of developing Alzheimer-type dementia in a subject in the same manner based on the concentration of isoleucine, methionine, threonine, glutamine, lysine, or S-adenosylmethionine.

When the concentration of lysine in the serum of a subject is higher than the reference value, the assessment unit 1 may assess the risk of developing vascular dementia as high. The assessment unit 1 may assess the risk of developing vascular dementia in a subject in the same manner based on the concentration of phenylalanine, leucine, isoleucine, glycine, asparagine, homocysteine, cystathionine, or S-adenosylhomocysteine.

It is noted that both Alzheimer-type dementia and vascular dementia are included in dementia, and thus assessment of the risk of developing Alzheimer-type dementia or vascular dementia is also included in assessment of the risk of developing dementia.

The reference values described above can be determined based on the results of a cohort study such as in Examples 1 or 2 described below. The cohort study has a follow-up period for a predetermined period of time after collection of blood. During the follow-up period, the subjects are diagnosed for whether they have developed dementia and the type of the dementia by a known method, such as by routine medical examination. For example, the reference value may be an intermediate value between the mean value of the concentrations of an amino acid in a plurality of subjects who have developed dementia during the follow-up period and the mean value of the concentrations of the same amino acid in a plurality of subjects who have not developed dementia.

The reference value may be a plurality of different values, for example, a reference value T1, and a reference value T2 that is larger than T1. In this case, for example, the assessment unit 1 may assess a subject having a concentration of methionine in the serum lower than T1 as having a "high" risk of developing dementia, or may assess a subject having a concentration of methionine higher than T1 and lower than T2 as having a "relatively high" risk of developing dementia, or may assess a subject having a concentration of methionine higher than T2 as having a "low" risk of developing dementia. The assessment unit 1 may perform the assessment by comparing the concentration of methionine in the serum of a subject with a plurality of reference values, and using a value representing the risk of developing dementia.

The follow-up period is not particularly limited as long as it is 1 month or longer, and is, for example, 6 months, 8 months, 10 months, 1 year, 2 years, 3 years, 4 years, 5 years, 6 to 10 years, 10 to 15 years, or 15 to 20 years. Preferably, the follow-up period is 5 years. In this case, the assessment unit 1 assesses the risk of developing dementia in a subject within 5 years after collection of the blood.

The assessment unit 1 inputs information showing the risk of developing dementia in a subject to the output unit 2. The information showing the risk of developing dementia is, for example, a value associated with a high or low risk of developing dementia. The output unit 2 displays the information showing the risk of developing dementia in a subject on the display 40.

Figure 2:
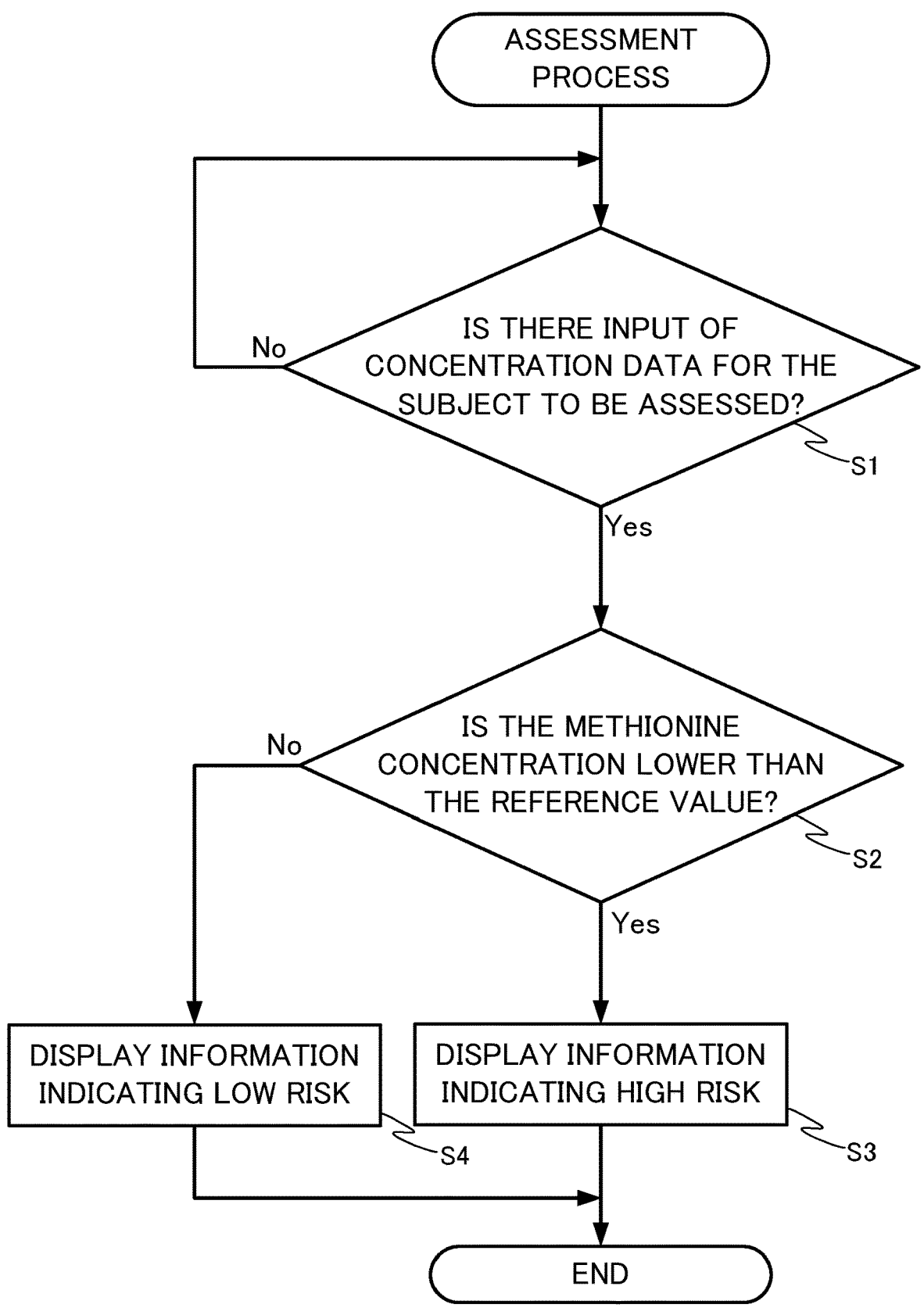
FIG. 2 is a diagram showing a flow chart of the assessment process by the disease risk assessment apparatus according to Embodiment 1 shown in FIG. 1.

Next, the assessment process executed by the disease risk assessment apparatus 100 will be described with reference to the flow chart shown in FIG. 2. The risk of developing dementia is assessed by comparing the concentration of methionine in the serum of a subject with the reference value. The reference value is previously stored in the storage 10.

The assessment unit 1 waits for an input of concentration data corresponding to the concentration of methionine in the serum of a subject, by a user via the input device 30 (step S1; No). When the concentration data from a subject is input (step S1; Yes), the assessment unit 1 compares the concentration of methionine with the reference value obtained by referring to the storage 10 (step S2). When the concentration of methionine is lower than the reference value (step S2; Yes), the output unit 2 displays information showing high risk of developing dementia in the subject on the display 40 (step S3). Conversely, when the concentration of methionine is higher than the reference value (step S2; No), the output unit 2 displays information showing low risk of developing dementia in the subject on the display 40 (step S4). Thereafter, the assessment unit 1 finishes the assessment process.

As described in detail above, the disease risk assessment apparatus 100 according to the present embodiment assesses the risk of developing dementia in a subject based on the concentration of a certain amino acid in the serum associated with development of dementia. This enables assessment of the risk of developing dementia with high accuracy. Since the concentration of an amino acid in serum can be relatively easily measured, the disease risk assessment apparatus 100 can easily assess the risk of developing dementia.

While the present embodiment uses the concentration of an amino acid in serum (concentration data) as information on the concentration of the above-described amino acid, the present disclosure is not restricted thereto. The information on the concentration of the amino acid may be the concentration of the amino acid in blood; or may be a value obtained by adding or subtracting a given value to or from the concentration of the amino acid in blood or serum, or multiplying or dividing the concentration of the amino acid in blood or serum by a given value; or may be a value obtained by transforming the concentration by a known transformation method, such as exponential transformation, logarithmic transformation, angular transformation, square root transformation, probit transformation, reciprocal transformation, box-cox transformation, or power transformation. Alternatively, the information on the concentration of the amino acid may be a value obtained by transforming the concentration of the amino acid with weighting according to gender or age.

Considering the difference in the concentration of each amino acid due to factors such as age, gender, educational level, maximum blood pressure, antihypertensives, diabetes mellitus, serum total cholesterol, obesity, past history of stroke, habit of smoking, habit of drinking, routine exercise, glomerular filtration rate, BMI, serum albumin concentration, total energy intake, and protein intake, the assessment unit 1 may assess the risk of developing dementia in a subject based on the concentration of an amino acid corrected for the effect of the above factors on the subject.

The disease risk assessment apparatus 100 may have a communication interface and may be connected to a network. The assessment unit 1 may receive concentration data send from an external device or the like connected to the network via means of communication, and assess the risk of developing dementia in a subject. Further, the output unit 2 may send information showing the risk of developing dementia in a subject to an external device via a communication interface. A user can conveniently send concentration data from a terminal as the external device installed in a medical institution such as hospital or clinic to obtain information showing the risk of developing dementia.

Embodiment 2

A disease risk assessment apparatus 200 according to Embodiment 2 will be described below. The disease risk assessment apparatus 200 has the same configuration as that of the disease risk assessment apparatus 100 according to Embodiment 1 described above. Thus, for the configuration of the disease risk assessment apparatus 200, reference is made to FIG. 1 with the disease risk assessment apparatus 100 replaced with the disease risk assessment apparatus 200. Hereinafter, the disease risk assessment apparatus 200 will be described mainly with respect to differences from the disease risk assessment apparatus 100.

The assessment unit 1 assesses the risk of developing dementia in a subject based on a combination of the concentrations of a plurality of the above-described amino acids in the serum of the subject. Specifically, the assessment unit 1 assesses the risk of developing dementia in a subject, based on the concentrations of a plurality of amino acids in the serum of the subject, wherein the amino acids is selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine. The assessment unit 1 may assess the risk of developing dementia in a subject based on the concentrations of the amino acids in the serum, to which at least one of tryptophan and valine is further added.

When assessing the risk of developing dementia or Alzheimer-type dementia in a subject, the assessment unit 1 preferably uses a combination of amino acids, methionine and threonine.

In assessment of the risk of developing Alzheimer-type dementia or vascular dementia in a subject, examples of the combination include:

essential amino acid (leucine, isoleucine, histidine, lysine, methionine, threonine, phenylalanine, valine, and tryptophan);

isoleucine, histidine, methionine, lysine, asparagine, and tryptophan;

isoleucine, histidine, methionine, lysine, asparagine, glutamine, and tryptophan; and isoleucine, lysine, and glutamine.

In assessment of the risk of developing Alzheimer-type dementia in a subject, preferred examples of the combination include:

isoleucine, histidine, methionine, lysine, and tryptophan; and isoleucine, histidine, methionine, lysine, glutamine, and tryptophan.

In assessment of the risk of developing vascular dementia in a subject, a preferred example of the combination includes:

isoleucine, lysine, asparagine, and glycine.

When the assessment unit 1 assesses the risk of developing dementia in a subject based on a combination of the concentrations of a plurality of amino acid, the information on the concentration of an amino acid in serum preferably is a score defined according to a predetermined rule. For example, a score for an amino acid may correspond to a predetermined range of the concentrations. In this case, a concentration range including higher concentrations, for example, corresponds to a higher score. Any plural number of concentration ranges may be defined per amino acid, and preferably four ranges are defined.

More specifically, concentration ranges defined for a certain amino acid in serum are Q1, Q2, Q3, and Q4 from lower to higher concentration ranges. Q1 includes the concentration of the amino acid ranging from $C_1$ (ng/mL, same as below) to $C_2$; Q2 includes from $C_3$ to $C_4$; Q3 includes from $C_5$ to $C_6$; and Q4 includes from $C_7$ to $C_8$ (here, $C_1<C_2<C_3<C_4<C_5<C_6<C_7<C_8$). Scores corresponding to Q1, Q2, Q3, and Q4 are $S_1$, $S_2$, $S_3$, and $S_4$, respectively ($S_1<S_2<S_3<S_4$). In the description below, a score corresponding to a concentration range of an amino acid in serum is referred to as "amino acid score," and an amino acid score is regarded as information on the concentration of the amino acid in serum.

The assessment unit 1 compares the sum of the amino acid scores corresponding to the amino acids with the reference value. More specifically, when the sum of the amino acid score of threonine and the amino acid score of methionine is smaller than the reference value, the assessment unit 1 assesses the risk of developing dementia or Alzheimer-type dementia in a subject as high. The assessment unit 1 may assess the risk of developing dementia or Alzheimer-type dementia in a subject as high when the sum of the amino acid scores of essential amino acids is smaller than the reference value. The assessment unit 1 may assess the risk of developing vascular dementia in a subject as high when the sum of the amino acid scores of essential amino acids is larger than the reference value.

Similarly, the assessment unit 1 may assess the risk of developing Alzheimer-type dementia in a subject as high when the sum of the amino acid scores of isoleucine, histidine, methionine, lysine, asparagine, and tryptophan, or the sum of the amino acid scores of them plus glutamine, is smaller than the reference value; or may assess the risk of developing vascular dementia in a subject as high when the sum is larger than the reference value.

The assessment unit 1 may assess the risk of developing Alzheimer-type dementia in a subject as high when the sum of the amino acid scores of isoleucine, lysine, and glycine is smaller than the reference value; or may assess the risk of developing vascular dementia in a subject as high when the sum is larger than the reference value.

For example, the reference value may be an intermediate value between the mean value of the sums of amino acid scores of certain amino acids in subjects who have developed dementia in a cohort study and the mean value of the sums of amino acid scores of the same amino acids in subjects who have not developed dementia.

Alternatively, the reference value may be an intermediate value between the median value of the sums of the amino acid scores in subjects who have developed dementia and the median value of the sums of the amino acid scores in subjects who have not developed dementia. Similarly as in Embodiment 1, a plurality of reference values may be used.

The assessment unit 1 may assess the risk of developing dementia in a subject based on the ratio of the concentrations of a plurality of amino acids. As shown in Example 2 below, a subject with higher ratio of the concentration of S-adenosylmethionine to the concentration of S-adenosylhomocysteine has a significantly lower risk of developing dementia, Alzheimer-type dementia, or vascular dementia than a subject with lower ratio. A subject with higher ratio of the concentration of methionine to the concentration of homocysteine has a significantly higher risk of developing dementia than a subject with lower ratio. Thus, for example, the assessment unit 1 assesses the risk of developing dementia, Alzheimer-type dementia, or vascular dementia in a subject, based on the concentration ratio between S-adenosylmethionine and S-adenosylhomocysteine. The assessment unit 1 may assess the risk of developing dementia in a subject, based on the concentration ratio between methionine and homocysteine in the blood of the subject. Preferably, the assessment unit 1 compares the concentration ratio with a reference value or the like.

In addition to comparison of the sum of the amino acid scores or the ratio of the concentrations with a reference value, the assessment unit 1 may assess the risk of developing dementia in a subject using an amino acid score, based on a model constructed using a known data mining method. Preferably, the model is constructed by supervised learning, in which the amino acid score obtained from the concentration of an amino acid in the serum of a subject without dementia is explanatory variable, and the information showing whether or not the subject develops dementia after the collection of the blood is objective variable.

In general, supervised learning is one of machine learning methods, in which learning is made by fitting on training data using a set of combinations of explanatory variables and objective variables associated therewith as the training data. Fitting is made by, for example, extracting features of explanatory variables contained in the training data and selecting features for each objective variable; extracting the characteristics of the data belonging to the objective variable; and generating criteria for identifying objective variables. Fitting can be performed to construct a model that outputs an objective variable to be associated with an explanatory variable from the input explanatory variable. The model can be used to output an objective variable corresponding to an explanatory variable that is not contained in the training data.

Preferably, the assessment unit 1 uses a model based on comparison of the amino acid score before the follow-up period of a subject who has developed dementia during the follow-up period in a cohort study with the amino acid score before the follow-up period of a subject who has not develop dementia during the follow-up period.

Training data obtained from a cohort study with a certain period of follow-up will be described. In a cohort study on a plurality of subjects, blood is collected from a subject a, subject b, subject c, subject d, and subject e (subject a to subject e) who have not developed dementia. The concentrations of an amino acid in the serum of the subject a to subject e are measured. The concentration of an amino acid may be measured immediately after the blood collection. Alternatively, the concentration of an amino acid in serum stored at −80° C., for example, may be measured after the follow-up period.

FIG. 3 is a table illustrating combinations of amino acid scores that are converted from the concentrations of amino acids in the serum of subject a to subject e, and information indication whether or not the subject a to subject e developed dementia (the presence of dementia) during a follow-up period that was started after the blood collection. Information indicating the presence of dementia indicates that the subject did not develop dementia during the follow-up period with "0", and that the subject developed dementia during the follow-up period with "1" and "2". In the information indicating the presence of dementia, "1" and "2" indicate that Alzheimer-type dementia and vascular dementia are developed, respectively. The table shown in FIG. 3 indicates that the subjects a, c, and d did not develop dementia during the follow-up period, the subject b and the subject e developed Alzheimer-type dementia and vascular dementia, respectively.

Taking the subject a as an example for description, "$C_{a1}$, $C_{a2}$, $C_{a3}$, $C_{a4}$, ..., $C_{a5}$," representing the amino acid scores of various amino acids are associated with "0," representing an information showing whether the subject developed dementia. In this case, the explanatory variables are $C_{a1}$ to $C_{a5}$, and the objective variable is a label (category) consisting of "0" in the training data.

Any known method may be used as the supervised learning method. Examples of the supervised learning method include discriminant analysis, linear regression, linear classification, multiple regression analysis, logistic regression, support vector machine, decision tree, neural network, convolutional neural network, perceptron, and k-nearest neighbor algorithm.

The constructed model is stored in the storage 10. The assessment unit 1 inputs an amino acid score in a subject to the model stored in the storage 10 to obtain information indicating the presence of dementia in the subject as the output. The information indicating the presence of dementia in the subject can also be considered as information indicating the risk of developing dementia in the subject in future. Thus, the assessment unit 1 assesses the risk of developing dementia in a subject.

Figure 4:
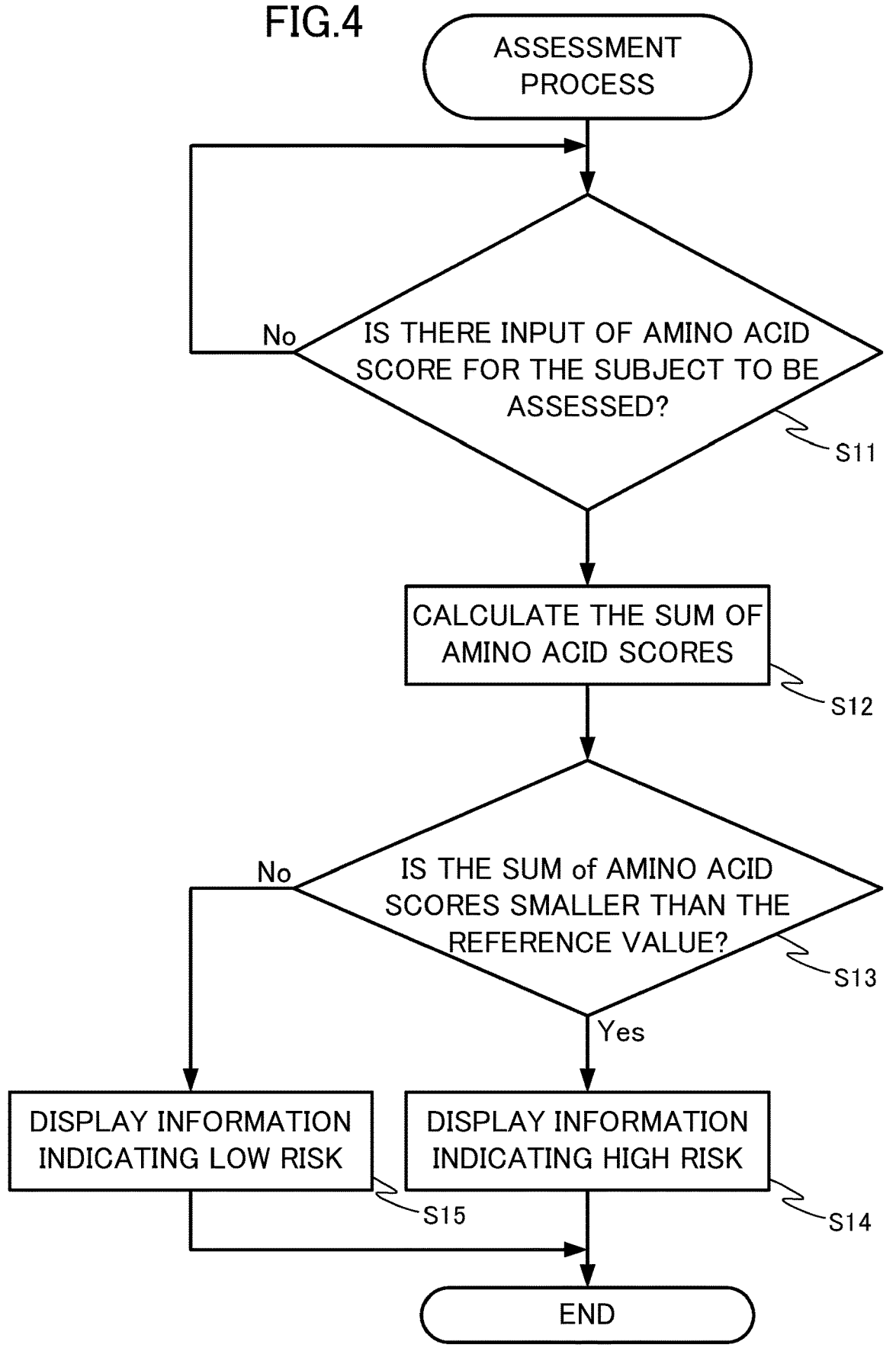
FIG. 4 is a diagram showing a flow chart of the assessment process by a disease risk assessment apparatus according to Embodiment 2 of the present disclosure.

The assessment process executed by the disease risk assessment apparatus 200 will be described with reference to the flow chart shown in FIG. 4. The risk of developing dementia is assessed by comparing the sum of the amino acid score of threonine and the amino acid score of methionine of a subject with the reference value. The reference value is previously stored in the storage 10.

The assessment unit 1 waits for inputs of the amino acid score of threonine and the amino acid score of methionine of a subject, by a user via the input device 30 (step S11; No). When the amino acid scores are input (step S11; Yes), the assessment unit 1 calculates the sum of the amino acid scores of threonine and methionine (step S12). The assessment unit 1 compares the sum of the amino acid scores with the reference value obtained by referring to the storage 10 (step S13). When the sum of the amino acid scores is smaller than the reference value (step S13; Yes), the output unit 2 displays information showing high risk of developing dementia in the subject on the display 40 (step S14). On the other hand, when the sum of the amino acid scores is larger than the reference value (step S13; No), the output unit 2 displays information showing low risk of developing dementia in the subject on the display 40 (step S15). Thereafter, the assessment unit 1 finishes the assessment process.

As described in detail above, the disease risk assessment apparatus 200 according to the present embodiment assesses the risk of developing dementia in a subject based on the concentration of a plurality of amino acids in the serum associated with development of dementia. This enables assessment of the risk of developing dementia with higher accuracy.

In the present embodiment the amino acid score is a score associated with a concentration range of an amino acid, and the concentration of the amino acid may be a value obtained by adding or subtracting a given value to or from the concentration of the amino acid in blood or serum, or multiplying or dividing the concentration of the amino acid in blood or serum by a given value; or may be a value obtained by transforming the concentration by a known transformation method; or a value obtained by transforming the concentration of the amino acid with weighting according to gender or age.

While in the present embodiment a user inputs an amino acid score in a subject to the disease risk assessment apparatus 200, the user may input the concentration of the amino acid in serum. The storage 10 previously stores a table associating a concentration of an amino acid or a concentration range of an amino acid with an amino acid score. The assessment unit 1 refers to the table in the storage 10 and obtains an amino acid score corresponding to the input concentration of an amino acid, to assess the risk of developing dementia in the subject.

The CPU 50 may function as a model construction unit for constructing the model described above. The model construction unit constructs the model by supervised learning using training data stored in the storage 10. More specifically, the model construction unit performs supervised learning using training data, in which an amino acid score in a subject is information corresponding to explanatory variable, and in which information indicating whether the subject develops dementia during the follow-up period is objective variable. The model construction unit stores the constructed model in the storage 10. Thus, the model can be improved or updated in response to increase of training data or modification in training data.

The model described above may be a model including, in addition to amino acid score, information on at least one factor such as age, gender, education level, maximum blood pressure, antihypertensive, diabetes mellitus, serum total cholesterol, obesity, past history of stroke, habit of smoking, habit of drinking, routine exercise, glomerular filtration rate, BMI, serum albumin concentration, total energy intake, and protein intake, as explanatory variables.

In other embodiments, a kit for assessing the risk of developing dementia is provided. The kit for assessing the risk of developing dementia includes a reagent for measuring the concentration of at least one amino acid selected from the group consisting of histidine, phenylalanine, leucine, isoleucine, methionine, threonine, glycine, glutamine, lysine, asparagine, homocysteine, cystathionine, S-adenosylmethionine, and S-adenosylhomocysteine in the serum of a subject. The reagent can measure the concentration of an amino acid in serum, preferably in a range from 0.1 to 1,000 ng/mL, from 0.1 to 500 ng/mL, or from 0.1 to 200 ng/mL, more preferably from 1 to 100 ng/mL. For example, the reagent is one for measuring the concentration of an amino acid in serum by colorimetric method or fluorescence method. The kit for assessing the risk of developing dementia may further include a reagent available for measuring the concentration of at least one of tryptophan and valine in serum.

Embodiment 3

Next, a food for dementia prevention according to Embodiment 3 will be described. The food for dementia prevention contains at least one selected from the group consisting of histidine, methionine, threonine, glutamine, and S-adenosylmethionine. As shown in Examples 1 and 2 below, when the concentrations of the amino acids in serum are low, the risk of developing dementia or Alzheimer-type dementia is high. Thus, food containing the amino acids can be taken to prevent or delay development of dementia.

The amino acids are contained in the food for dementia prevention at such concentrations that the food prevents or delays development of dementia in a user who has taken the food. Preferably, the food for dementia prevention contains the amino acids as active ingredients. Suitably, the amino acids to be contained are artificially added or increased in the food for dementia prevention.

Exemplary forms of the food for dementia prevention include confectioneries such as candy, cookie, tablet confectionery, chewing gum and jelly; processed cereal products such as noodle, bread, rice, and biscuit; paste products such as sausage, ham, and boiled fish paste; dairy products such as butter and yogurt; rice seasoning; and condiments. The food for dementia prevention may include beverages, such as energy drink, soft drink, black tea, and green tea. The food for dementia prevention may contain additives such as sweetener, flavor, and colorant. The food for dementia prevention may be provided in the form of powder, tablet, capsule, or the like.

The content of the amino acid in the food for dementia prevention is typically from 0.0001 to 100% by weight, preferably from 1 to 95% by weight. The intake of the amino acid is not particularly limited, and may fall within a range from 1 mg to 100 g per adult per day, preferably from 10 mg to 100 g, more preferably from 100 mg to 50 g. For example, the food for dementia prevention is taken every day or at intervals of one day or longer. The intake interval may be from 7 days to 14 days.

As described in detail above, the food for dementia prevention according to the present embodiment contains an amino acid, whose low concentration in serum represents high risk of developing dementia or Alzheimer-type dementia. Thus, the food for dementia prevention can be taken to reduce the risk of developing dementia or Alzheimer-type dementia. Food processing can adjust the taste, smell, flavor, and the like of the food for dementia prevention in accordance with preference. In addition, food processing allows for convenient intake of the amino acid via diet.

In other embodiments, a supplement for dementia prevention is provided containing at least one selected from the group consisting of histidine, methionine, threonine, glutamine, and S-adenosylmethionine. The supplement for dementia prevention may be provided in the form of liquid, powder, tablet, capsule, or the like. In still other embodiments, an agent for preventing dementia is provided containing at least one selected from the group consisting of histidine, methionine, threonine, glutamine, and S-adenosylmethionine. In still other embodiments, an additive for preventing dementia is provided containing at least one selected from the group consisting of histidine, methionine, threonine, glutamine, and S-adenosylmethionine.

EXAMPLES

The present disclosure will be described in more detail with reference to examples below, but is not limited to the examples in any way.

Example 1

(Subject)

The Hisayama study is a prospective cohort study of cardiovascular disease started in 1961 in Hisayama, Fukuoka Prefecture. Every 5 to 7 years since 1985, the elderly people have been subjected to repeated screening survey for dementia, with follow-up study of dementia. In the present Example, blood collection was performed in the baseline survey in 2007, and thereafter the presence or absence of dementia was investigated during the 5-year follow-up period up to 2012. After removing residents who had dementia at the time of the baseline survey, 1784 serum samples (779 men and 1005 women) were available for this example.

(Measurement of Concentration of Amino Acid in Serum)

A cryopreserved serum sample was thawed at room temperature. Fifteen micro litter of the serum sample and an equal amount of 5% sulfosalicylic acid were added to a tube and pipetted to promote protein denaturation and precipitate formation. The tube was centrifuged at 15,000 rpm for 5 minutes using a centrifuge. Ten micro litter of the obtained supernatant was added to a measurement vial and diluted with 60 µL of 0.1% formic acid/acetonitrile to obtain a measurement sample. The 5% sulfosalicylic acid contained amino acid stable isotopes with known concentrations previously dissolved in 0.1 N hydrochloric acid.

Agilent 6495 Triple Quadrupole LC/MS system (produced by Agilent Technologies, Inc.) was used as a mass spectrometer to perform mass spectrometry. Intrada Amino Acid column (50×3 mm, Imtakt Corporation) was coupled to the mass spectrometer, and equilibrated with an initial eluent. The composition of the initial eluent was 86% of 0.1% formic acid/acetonitrile (A solution) and 14% of 100 mM ammonium formate (B solution).

One micro litter of a measurement sample was applied to the column at a flow rate of 0.6 mL/min. The column temperature was 40° C. The gradient elution conditions were as follows: 14% B solution for 3 minutes; a linear gradient of 14-100% B solution over 7 minutes; 100% B solution for 5 minutes; and 14% B solution for 5 minutes. Separately from the measurement sample, quality control (QC) samples containing 5 ppm, 2 ppm, or 0.01 ppm of amino acid standards were analyzed in the same manner as the measurement sample in order to check the condition of the mass spectrometer and determine the replacement period for the column. The QC samples were prepared by dissolving amino acid standards in MilliQ, mixed with 5% sulfosalicylic acid containing amino acid stable isotopes, and then diluted with 0.1% formic acid/acetonitrile in the same manner as in the measurement sample.

Measurement data was obtained using MassHunter Workstation Software version B.08.00. The concentration of an amino acid in the serum sample was determined based on the relationship between the peak area and the concentration of each amino acid stable isotope. For each amino acid, the subjects were divided into four quartiles according to the quartiles for the concentration of the amino acid in the serum sample. The four quartiles were defined as Q1, Q2, Q3, and Q4, from low to high ranges of the concentration of the amino acid.

(Other Risk Factors)

The blood pressure of a subject was measured three times after 5-minute rest in a sitting position using an automatic sphygmomanometer, and the mean value from the three measurement was used for analysis. A subject with a blood pressure of 140/90 mmHg or more, or a subject using an antihypertensive was defined as hypertension. The blood glucose was measured by hexokinase method. A subject with a fasting blood glucose of 7.0 mmol/L or more, or with a blood glucose after glucose tolerance or 2 hours after a meal of 11.1 mmol/L or more, or taking an antidiabetic agent was defined as diabetes mellitus. The serum total cholesterol concentration was enzymatically measured. The height and weight of the subject was measured, and then body mass index (BMI) was calculated. A subject with a BMI of 25.0 $kg/m^2$ or more was defined as obesity.

The past history of stroke was defined as having developed symptoms of stroke, including ischemic cerebral infarction, cerebral hemorrhage, and subarachnoid hemorrhage. All symptoms of stroke were determined based on investigation of available clinical information such as physical examination and medical records, and images. Information on education level, habit of smoking, alcohol intake, physical activity, and medical history of hypertension and diabetes mellitus were obtained by standard questionnaires. A subject who had experienced formal education for a period of 9 years or shorter was defined as low education level. For the habit of smoking and the habit of drinking, a subject was classified based on whether the subject currently smoked, and whether the subject currently drank. A subject who engaged in sports or work more than three times a week was classified into a group exercising daily. The total energy intake per day was estimated using a brief-type self-administered diet history questionnaire (BDHQ).

(Follow-Up Study)

Subjects involved in the baseline survey in 2007 were subjected to a follow-up study up to 2012. New dementia and stroke events were collected via a routine monitoring system established by the study team, local physicians, and welfare management offices. In the system, physicians in the study team routinely visited medical institutions and welfare management offices and collected information on dementia and stroke events, including suspected cases. In addition, a medical examination was conducted every year to collect information on new dementia and stroke events. Health information for all subjects who could not receive the medical examination was checked once a year in documents or the like.

Furthermore, comprehensive assessments of cognitive functions, including neuropsychological tests, such as mini mental state examination and Hasegawa's dementia scale-revised, were performed in 2012, and cases of dementia were detected as accurately as possible. When a subject was suspected of having a new neurological symptom such as cognitive impairment, the study team carefully diagnosed the subject. The study group consisted of medical specialists, who conducted various examinations including physical examinations and neurological examinations, interviewed subject's family and attending physicians, and surveyed medical records.

When a subject died, all available clinical information was reviewed, and the subject's attending physician and family was interviewed. Subjects who died during the follow-up period were subject to autopsy only when their families permitted.

(Diagnosis of Dementia)

The guidelines in Diagnostic and Statistical Manual of Mental Disorders, 3rd Edition (American Psychiatric Association, 1987) were used for diagnosis of dementia. The criteria used for the determination of Alzheimer-type dementia were described in National Institute of Neurological and Communicative Disorders and Stroke and the Alzheimer's Disease and Related Disorders Association (McKhann G, and five others, "Clinical diagnosis of Alzheimer's disease: report of the NINCDS-ADRDA Work Group under the auspices of Department of Health and Human Services Task Force on Alzheimer's Disease", Neurology, 1984, 34, 939-944).

The criteria used for the determination of vascular dementia were described in National Institute of Neurological Disorders and Stroke-Association International pour la Recherche et l'Enseignement en Neurosciences (Roman GC, and 30 others, "Vascular dementia: diagnostic criteria for research studies: report of the NINDS-AIREN International Workshop", Neurology, 1993, 43, 250-260).

All dementia cases were judged by stroke specialists and psychiatrists. Possible types of dementia were determined based on morphology using clinical information and nerve images. The type of dementia was determined based on clinical and neuropathological information from a subject with dementia who had undergone autopsy (Fujimi K, and 10 others, "Clinicopathological outline of dementia with Lewy bodies applying the revised criteria: the Hisayama Study", Brain Pathol, 2008, 18, 317-325).

During the follow-up period, 227 subjects developed dementia. These subjects were subjected to morphology as appropriate. Of these, 156 subjects were diagnosed as Alzheimer-type dementia, while 55 were as vascular dementia.

(Statistical Analysis)

For Q1 to Q4, the hazard rate (HR) and the 95% confidence interval (95% CI) were determined using Cox proportional hazards model. Analysis was performed using the following model: model 1, including age and gender as baseline covariates; model 2, including age, gender, education level, maximum blood pressure, antihypertensive, diabetes mellitus, serum total cholesterol, obesity, past history of stroke, habit of smoking, habit of drinking, routine exercise, and total energy intake as baseline covariates; or model 3, further including protein intake in addition to the baseline covariates in model 2, as baseline covariates. All statistical analyses were performed using SAS 9.4 (produced by SAS Institute Inc.). A two-sided test with $p<0.05$ was considered statistically significant.

For each amino acid, Q1, Q2, Q3, and Q4 were assigned to amino acid scores of "−2," "−1," "1," and "2," respectively. The sum of the amino acid scores for a plurality of predetermined amino acids was also calculated, and the subjects were divided into four quartiles according to the quartiles for the sum of the amino acid scores. The four quartiles were defined as Qs1, Qs2, Qs3, and Qs4, from low to high ranges of the sum of the amino acid scores.

(Results)

For each amino acid, the hazard rates of Q2-Q4 to Q1 (first quartile) and the like were compared. For dementia, Alzheimer-type dementia and vascular dementia, amino acids with statistical significance or close thereto are shown in Table 1, Table 2, and Table 3, respectively.

TABLE 1

| Amino Acid | Quartiles | Median Value (ng/ml) | Onset/ Subject | Incidence (/$10^3$ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Met | Q1 (1.93-3.42) | 3.14 | 76/446 | 36.5 | 1.00 | | 0.02 | 1.00 | | 0.09 | 1.00 | | 0.09 |
| | Q2 (3.42-3.80) | 3.62 | 65/446 | 30.5 | 0.89 (0.64-1.25) | 0.51 | | 1.05 (0.73-1.52) | 0.79 | | 1.05 (0.73-1.52) | 0.79 | |
| | Q3 (3.80-4.29) | 4.03 | 46/445 | 21.2 | 0.68 (0.47-1.00) | 0.05 | | 0.78 (0.51-1.18) | 0.24 | | 0.78 (0.51-1.18) | 0.24 | |
| | Q4 (4.30-9.74) | 4.72 | 40/447 | 18.0 | 0.66 (0.44-0.98) | 0.04 | | 0.73 (0.46-1.14) | 0.17 | | 0.72 (0.46-1.14) | 0.16 | |
| Thr | Q1 (6.09-14.12) | 12.98 | 78/446 | 37.7 | 1.00 | | 0.04 | 1.00 | | 0.07 | 1.00 | | 0.07 |
| | Q2 (14.12-15.98) | 15.16 | 61/446 | 28.0 | 1.11 (0.79-1.57) | 0.54 | | 0.90 (0.62-1.33) | 0.60 | | 0.92 (0.63-1.36) | 0.69 | |
| | Q3 (15.98-18.28) | 16.91 | 52/446 | 24.0 | 0.88 (0.61-1.25) | 0.47 | | 0.94 (0.65-1.37) | 0.76 | | 0.95 (0.65-1.38) | 0.78 | |
| | Q4 (18.28-34.81) | 20.25 | 36/446 | 16.4 | 0.68 (0.45-1.01) | 0.06 | | 0.61 (0.39-0.96) | 0.03 | | 0.62 (0.40-0.97) | 0.04 | |
| Gln | Q1 (7.56-89.90) | 81.87 | 50/446 | 23.3 | 1.00 | | 0.06 | 1.00 | | 0.17 | 1.00 | | 0.17 |
| | Q2 (89.90-99.82) | 95.05 | 58/446 | 27.3 | 0.95 (0.65-1.40) | 0.81 | | 1.04 (0.68-1.59) | 0.85 | | 1.04 (0.68-1.59) | 0.85 | |
| | Q3 (99.89-109.77) | 104.60 | 62/446 | 28.6 | 0.91 (0.62-1.32) | 0.61 | | 0.93 (0.60-1.42) | 0.72 | | 0.93 (0.60-1.42) | 0.73 | |
| | Q4 (109.82-181.06) | 117.10 | 57/446 | 26.3 | 0.70 (0.48-1.03) | 0.07 | | 0.77 (0.50-1.19) | 0.24 | | 0.77 (0.50-1.19) | 0.24 | |

TABLE 2

| Amino Acid | Quartiles | Median Value (ng/ml) | Onset/ Subject | Incidence (/$10^3$ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| His | Q1 (6.11-11.32) | 10.59 | 59/446 | 29.4 | 1.00 | | 0.01 | 1.00 (reference) | | 0.07 | 1.00 (reference) | | 0.07 |
| | Q2 (11.32-12.41) | 11.87 | 49/446 | 22.6 | 0.98 (0.67-1.44) | 0.93 | | 1.06 (0.70-1.62) | 0.77 | | 1.07 (0.70-1.63) | 0.77 | |
| | Q3 (12.41-13.50) | 12.91 | 24/446 | 10.9 | 0.55 (0.34-0.89) | 0.02 | | 0.58 (0.35-4.97) | 0.04 | | 0.58 (0.35-0.97) | 0.04 | |
| | Q4 (13.50-18.76) | 14.36 | 24/446 | 10.8 | 0.64 (0.40-1.04) | 0.07 | | 0.75 (0.45-1.27) | 0.29 | | 0.76 (0.45-1.28) | 0.29 | |
| Ile | Q1 (4.70-7.63) | 6.86 | 53/446 | 25.0 | 1.00 | | 0.02 | 1.00 | | 0.02 | 1.00 | | 0.02 |
| | Q2 (7.63-8.83) | 8.26 | 50/446 | 23.0 | 1.20 (0.81-1.77) | 0.37 | | 1.24 (0.81-1.90) | 0.32 | | 1.25 (0.81-1.91) | 0.31 | |
| | Q3 (8.83-10.14) | 9.45 | 32/446 | 15.0 | 0.66 (0.42-1.04) | 0.07 | | 0.58 (0.35-0.98) | 0.04 | | 0.59 (0.35-0.98) | 0.04 | |
| | Q4 (10.15-20.00) | 11.23 | 21/446 | 9.7 | 0.61 (0.35-1.04) | 0.07 | | 0.64 (0.36-1.15) | 0.13 | | 0.64 (0.36-1.14) | 0.13 | |
| Met | Q1 (1.93-3.42) | 3.14 | 56/446 | 26.9 | 1.00 | | 0.02 | 1.00 | | 0.02 | 1.00 | | 0.02 |
| | Q2 (3.42-3.80) | 3.62 | 44/446 | 20.7 | 0.84 (0.57-1.25) | 0.40 | | 0.90 (0.58-1.39) | 0.63 | | 0.90 (0.58-1.39) | 0.64 | |
| | Q3 (3.80-4.29) | 4.03 | 35/445 | 16.1 | 0.76 (0.49-1.17) | 0.21 | | 0.80 (0.50-1.28) | 0.35 | | 0.80 (0.50-1.28) | 0.35 | |
| | Q4 (4.30-9.74) | 4.72 | 21/447 | 9.5 | 0.53 (0.31-0.89) | 0.02 | | 0.49 (0.27-0.88) | 0.02 | | 0.49 (0.27-0.88) | 0.02 | |
| Val | Q1 (13.76-23.43) | 21.36 | 53/446 | 25.5 | 1.00 (reference) | | 0.09 | 1.00 (reference) | | 0.10 | 1.00 (reference) | | 0.10 |
| | Q2 (23.43-26.55) | 25.18 | 51/446 | 24.0 | 1.16 (0.78-1.70) | 0.46 | | 1.19 (0.77-1.83) | 0.43 | | 1.19 (0.77-1.83) | 0.43 | |
| | Q3 (26.57-29.90) | 28.27 | 27/446 | 12.2 | 0.64 (0.40-1.02) | 0.06 | | 0.64 (0.38-1.07) | 0.09 | | 0.64 (0.39-1.07) | 0.09 | |
| | Q4 (29.91-48.50) | 32.38 | 25/446 | 11.4 | 0.79 (0.48-1.30) | 0.35 | | 0.77 (0.44-1.34) | 0.36 | | 0.77 (0.44-1.34) | 0.36 | |
| Thr | Q1 (6.09-14.12) | 12.98 | 57/446 | 27.6 | 1.00 | | 0.08 | 1.00 | | 0.11 | 1.00 | | 0.11 |
| | Q2 (14.12-15.98) | 15.16 | 40/446 | 18.4 | 1.05 (0.69-1.59) | 0.82 | | 0.79 (0.49-1.25) | 0.31 | | 0.79 (0.50-1.26) | 0.32 | |
| | Q3 (15.98-18.28) | 16.91 | 35/446 | 16.2 | 0.86 (0.56-1.32) | 0.50 | | 0.89 (0.57-1.39) | 0.60 | | 0.89 (0.57-1.39) | 0.60 | |
| | Q4 (18.28-34.81) | 20.25 | 24/446 | 11.0 | 0.65 (0.40-1.06) | 0.09 | | 0.61 (0.36-1.03) | 0.07 | | 0.61 (0.36-1.04) | 0.07 | |
| Gln | Q1 (7.56-89.90) | 81.87 | 35/446 | 16.3 | 1.00 | | 0.01 | 1.00 | | 0.04 | 1.00 | | 0.04 |
| | Q2 (89.90-99.82) | 95.05 | 43/446 | 20.2 | 0.96 (0.61-1.50) | 0.85 | | 1.01 (0.61-1.65) | 0.98 | | 1.01 (0.61-1.65) | 0.98 | |
| | Q3 (99.89-109.77) | 104.60 | 43/446 | 19.8 | 0.84 (0.53-1.32) | 0.45 | | 0.85 (0.52-1.41) | 0.54 | | 0.85 (0.52-1.41) | 0.54 | |
| | Q4 (109.82-181.06) | 117.10 | 35/446 | 16.1 | 0.58 (0.36-0.93) | 0.02 | | 0.61 (0.36-1.03) | 0.07 | | 0.61 (0.36-1.03) | 0.07 | |
| Lys | Q1 (13.83-27.75) | 25.66 | 54/446 | 26.1 | 1.00 | | 0.006 | 1.00 | | 0.03 | 1.00 | | 0.03 |
| | Q2 (27.75-30.74) | 29.21 | 52/446 | 24.2 | 1.08 (0.74-1.58) | 0.70 | | 1.16 (0.76-1.77) | 0.49 | | 1.17 (0.76-1.78) | 0.47 | |
| | Q3 (30.76-34.10) | 32.24 | 27/446 | 12.1 | 0.60 (0.38-0.96) | 0.03 | | 0.65 (0.39-1.07) | 0.09 | | 0.65 (0.39-1.08) | 0.09 | |
| | Q4 (34.12-48.82) | 36.70 | 23/446 | 10.6 | 0.59 (0.36-0.96) | 0.03 | | 0.66 (0.39-1.13) | 0.13 | | 0.66 (0.39-1.13) | 0.13 | |

TABLE 3

| Amino Acid | Quartiles | Median Value (ng/ml) | Onset/ Subject | Incidence (/$10^3$ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Phe | Q1 (10.68-15.63) | 14.64 | 9/446 | 4.2 | 1.00 | | 0.08 | 1.00 | | 0.07 | 1.00 | | 0.07 |
| | Q2 (15.64-17.23) | 16.51 | 13/446 | 5.9 | 1.48 (0.63-3.46) | 0.37 | | 1.57 (0.64-3.86) | 0.33 | | 1.56 (0.64-3.84) | 0.33 | |
| | Q3 (17.23-18.98) | 18.08 | 16/446 | 7.4 | 1.96 (0.86-4.45) | 0.11 | | 2.56 (1.06-6.20) | 0.04 | | 2.65 (1.10-6.40) | 0.03 | |
| | Q4 (18.99-49.92) | 20.22 | 17/446 | 8.0 | 1.96 (0.87-4.41) | 0.11 | | 2.08 (0.82-5.28) | 0.12 | | 2.04 (0.81-5.16) | 0.13 | |

TABLE 3-continued

| Amino Acid | Quartiles | Median Value (ng/ml) | Onset/ Subject | Incidence (/10³ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Leu | Q1 (10.33-16.13) | 14.76 | 10/446 | 4.8 | 1.00 | | 0.11 | 1.00 | | 0.04 | 1.00 | | 0.04 |
| | Q2 (16.14-18.15) | 17.10 | 14/446 | 6.5 | 1.48 (0.65-3.35) | 0.35 | | 1.58 (0.65-3.83) | 0.31 | | 1.71 (0.70-4.19) | 0.24 | |
| | Q3 (18.16-20.10) | 19.04 | 15/446 | 6.9 | 1.82 (0.80-4.15) | 0.15 | | 1.67 (0.64-4.36) | 0.29 | | 1.69 (0.65-4.40) | 0.28 | |
| | Q4 (20.12-33.63) | 21.57 | 16/446 | 7.3 | 1.94 (0.84-4.49) | 0.12 | | 2.62 (1.04-6.61) | 0.04 | | 2.71 (1.07-6.84) | 0.04 | |
| Ile | Q1 (4.70-7.63) | 6.86 | 8/446 | 3.8 | 1.00 | | 0.02 | 1.00 | | 0.009 | 1.00 | | 0.01 |
| | Q2 (7.63-8.83) | 8.26 | 12/446 | 5.5 | 1.74 (0.70-4.28) | 0.23 | | 2.72 (0.95-7.80) | 0.06 | | 2.81 (0.98-8.07) | 0.05 | |
| | Q3 (8.83-10.14) | 9.45 | 16/446 | 7.5 | 1.91 (0.80-4.54) | 0.14 | | 2.62 (0.92-7.48) | 0.07 | | 2.73 (0.96-7.77) | 0.06 | |
| | Q4 (10.15-20.00) | 11.23 | 19/446 | 8.7 | 2.78 (1.15-6.72) | 0.02 | | 4.38 (1.51-12.67) | 0.007 | | 4.29 (1.48-12.39) | 0.007 | |
| Gly | Q1 (13.21-23.65) | 21.91 | 9/446 | 4.2 | 1.00 | | 0.05 | 1.00 | | 0.06 | 1.00 | | 0.06 |
| | Q2 (23.65-27.04) | 25.42 | 11/446 | 5.1 | 1.12 (0.46-2.71) | 0.80 | | 1.37 (0.52-3.61) | 0.53 | | 1.27 (0.48-3.36) | 0.63 | |
| | Q3 (27.04-30.64) | 28.71 | 16/446 | 7.4 | 1.48 (0.65-3.35) | 0.35 | | 1.44 (0.57-3.66) | 0.44 | | 1.52 (0.60-3.87) | 0.38 | |
| | Q4 (30.65-63.59) | 34.17 | 19/446 | 8.9 | 2.02 (0.91-4.47) | 0.08 | | 2.31 (0.95-5.65) | 0.07 | | 2.24 (0.92-5.48) | 0.08 | |
| Lys | Q1 (13.83-27.75) | 25.66 | 10/446 | 4.8 | 1.00 | | 0.007 | 1.00 | | 0.005 | 1.00 | | 0.004 |
| | Q2 (27.75-30.74) | 29.21 | 12/446 | 5.6 | 1.30 (0.56-3.00) | 0.55 | | 1.29 (0.52-3.23) | 0.59 | | 1.42 (0.57-3.56) | 0.45 | |
| | Q3 (30.76-34.10) | 32.24 | 9/446 | 4.0 | 1.01 (0.41-2.50) | 0.98 | | 0.95 (0.34-2.64) | 0.93 | | 1.01 (0.36-2.79) | 0.99 | |
| | Q4 (34.12-48.82) | 36.70 | 24/446 | 11.1 | 2.82 (1.33-5.96) | 0.007 | | 3.32 (1.45-7.64) | 0.005 | | 3.55 (1.53-8.20) | 0.003 | |
| Asn | Q1 (3.77-6.19) | 5.77 | 10/443 | 4.8 | 1.00 | | 0.07 | 1.00 | | 0.01 | 1.00 | | 0.02 |
| | Q2 (6.19-6.82) | 6.52 | 14/449 | 6.4 | 1.38 (0.61-3.12) | 0.43 | | 1.34 (0.55-3.26) | 0.52 | | 1.36 (0.55-3.31) | 0.50 | |
| | Q3 (6.82-7.52) | 7.14 | 13/446 | 6.0 | 1.30 (0.57-2.98) | 0.53 | | 1.53 (0.63-3.74) | 0.35 | | 1.46 (0.60-3.58) | 0.40 | |
| | Q4 (7.52-14.10) | 8.08 | 18/446 | 8.3 | 2.13 (0.97-4.65) | 0.06 | | 2.97 (1.26-7.02) | 0.01 | | 2.89 (1.22-6.81) | 0.02 | |

As shown in Table 1, the subjects with higher concentration of methionine or threonine in serum had a significantly lower risk of developing dementia than the subjects with lower concentration. In addition, the subjects with higher concentration of glutamine in serum tended to have a lower risk of developing dementia than the subjects with lower concentration. As shown in Table 2, the subjects with higher concentration of histidine, isoleucine, methionine, glutamine, or lysine in serum had a significantly lower risk of developing Alzheimer-type dementia than the subjects with lower concentration. In addition, the subjects with higher concentration of valine or threonine in serum tended to have a lower risk of developing Alzheimer-type dementia than the subjects with lower concentration. As shown in Table 3, the subjects with higher concentration of phenylalanine, leucine, isoleucine, glycine, lysine, or asparagine in serum had a significantly higher risk of developing vascular dementia than the subjects with lower concentration.

In an analysis combining a plurality of amino acids, the hazard rates and the like of Qs2 to Qs4 were compared to those of Qs1 (first quartile). For dementia, Alzheimer-type dementia and vascular dementia, combinations of amino acids with statistical significance are shown in Table 4, Table 5, and Table 6, respectively.

TABLE 4

| Amino Acid | Quartiles | Median Value | Onset/ Subject | Incidence (/10³ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Thr. Met | Qs1 (0-0) | 0 | 48/253 | 41.3 | 1.00 | | 0.01 | 1.00 | | 0.04 | 1.00 | | 0.04 |
| | Qs2 (1-2) | 2 | 80/517 | 32.5 | 0.91 (0.63-1.30) | 0.59 | | 0.97 (0.64-1.47) | 0.88 | | 0.97 (0.64-1.47) | 0.90 | |
| | Qs3 (3-4) | 4 | 57/523 | 22.2 | 0.70 (0.47-1.03) | 0.07 | | 0.79 (0.51-1.23) | 0.29 | | 0.81 (0.52-1.25) | 0.34 | |
| | Qs4 (5-6) | 6 | 42/491 | 17.4 | 0.62 (0.40-0.95) | 0.03 | | 0.65 (0.40-1.06) | 0.03 | | 0.65 (0.40-1.05) | 0.08 | |

TABLE 5

| Amino Acid | Quartiles | Median Value | Onset/Subject | Incidence (/10³ Pys) | Model 1 HR (95% CI) | p value | p for trend | Model 2 HR (95% CI) | p value | p for trend | Model 3 HR (95% CI) | P value | p for trend |
|---|---|---|---|---|---|---|---|---|---|---|---|---|---|
| Essential Amino Acid | Qs1 (0-7) | 4 | 63/437 | 31.3 | 1.00 | | 0.003 | 1.00 | | 0.006 | 1.00 | | 0.007 |
| | Qs2 (8-13) | 11 | 45/448 | 20.7 | 0.76 (0.52-1.12) | 0.17 | | 0.84 (0.55-1.28) | 0.42 | | 0.84 (0.55-1.28) | 0.42 | |
| | Qs3 (14-18) | 16 | 24/396 | 12.5 | 0.51 (0.32-0.83) | 0.006 | | 0.48 (0.28-0.82) | 0.007 | | 0.48 (0.28-0.82) | 0.007 | |
| | Qs4 (19-27) | 22 | 24/503 | 9.6 | 0.56 (0.34-0.92) | 0.02 | | 0.56 (0.32-0.98) | 0.04 | | 0.56 (0.32-0.98) | 0.04 | |
| Thr, Met | Qs1 (0-0) | 0 | 35/253 | 30.1 | 1.00 | | 0.02 | 1.00 | | 0.02 | 1.00 | | 0.02 |
| | Qs2 (1-2) | 2 | 56/517 | 22.8 | 0.90 (0.59-1.37) | 0.61 | | 0.87 (0.54-1.40) | 0.57 | | 0.87 (0.54-1.40) | 0.57 | |
| | Qs3 (3-4) | 4 | 41/523 | 16.0 | 0.74 (.47-1.18) | 0.21 | | 0.74 (0.44-1.23) | 0.25 | | 0.74 (0.45-1.24) | 0.26 | |
| | Qs4 (5-6) | 6 | 24/491 | 9.9 | 0.54 (0.32-0.92) | 0.02 | | 0.53 (0.29-0.95) | 0.03 | | 0.53 (0.29-0.95) | 0.03 | |
| Ile, His, Trp, Met, Lys, Asn | Qs1 (0-4) | 3 | 52/368 | 30.7 | 1.00 | | 0.005 | 1.00 | | 0.02 | 1.00 | | 0.02 |
| | Qs2 (5-8) | 6 | 53/473 | 23.8 | 1.01 (0.68-1.48) | 0.98 | | 0.99 (0.64-1.52) | 0.95 | | 0.98 (0.64-1.52) | 0.95 | |
| | QS3 (9-12) | 11 | 31/459 | 13.7 | 0.64 (0.41-1.02) | 0.06 | | 0.65 (0.39-1.07) | 0.08 | | 0.65 (0.39-1.07) | 0.09 | |
| | Qs4 (13-18) | 15 | 20/484 | 8.3 | 0.52 (0.30-0.89) | 0.02 | | 0.57 (0.33-1.01) | 0.06 | | 0.57 (0.33-1.01) | 0.06 | |
| Ile, His, Trp, Met, Lys, Asn, Gln | Qs1 (0-5) | 3 | 51/344 | 32.3 | 1.00 | | <0.001 | 1.00 | | 0.006 | 1.00 | | 0.006 |
| | Qs2 (6-10) | 8 | 55/545 | 21.3 | 0.70 (0.48-1.02) | 0.07 | | 0.73 (0.48-1.12) | 0.16 | | 0.73 (0.48-1.12) | 0.16 | |
| | Qs3 (11-14) | 13 | 30/430 | 14.2 | 0.58 (0.37-0.92) | 0.02 | | 0.58 (0.35-0.96) | 0.03 | | 058 (0.35-0.96) | 0.03 | |
| | Qs4 (15-21) | 17 | 20/465 | 8.6 | 0.41 (0.24-0.70) | 0.001 | | 049 (0.28-0.85) | 0.01 | | 049 (0.28-0.85) | 0.01 | |
| Ile, Lys, Gln | Qs1 (0-2) | 1 | 42/353 | 25.0 | 1.00 | | 0.04 | 1.00 | | 0.06 | 1.00 | | 0.06 |
| | Qs2 (3-3) | 3 | 30/264 | 24.0 | 0.86 (0.54-1.38) | 0.53 | | 0.95 (0.57-1.58) | 0.83 | | 0.94 (0.56-1.58) | 0.83 | |
| | Qs3 (4-5) | 4 | 50/566 | 18.3 | 0.84 (0.55-1.26) | 0.40 | | 0.79 (0.50-1.26) | 0.32 | | 0.79 (0.50-1.26) | 0.33 | |
| | Qs (6-9) | 7 | 34/601 | 11.6 | 0.60 (0.38-0.95) | 0.03 | | 0.64 (0.39-1.04) | 0.07 | | 0.64 (0.39-1.04) | 0.07 | |

TABLE 6

| Amino Acid | Quartiles | Median Value | Onset/Subject | Incidence (/10³ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Essential Amino Acid | Qs1 (0-7) | 4 | 10/437 | 5.0 | 1.00 | | 0.10 | 1.00 | | 0.02 | 1.00 | | 0.02 |
| | Qs2 (8-13) | 11 | 16/448 | 7.4 | 1.53 (0.69-3.39) | 0.30 | | 2.16 (0.87-5.35) | 0.10 | | 2.30 (0.92-5.70) | 0.07 | |
| | Qs3 (14-18) | 16 | 9/396 | 4.7 | 1.06 (0.43-2.65) | 0.89 | | 1.46 (0.52-4.07) | 0.47 | | 1.51 (0.54-4.21) | 0.43 | |
| | Qs4 (19-27) | 22 | 20/503 | 8.0 | 2.23 (0.99-5.03) | 0.05 | | 3.85 (1.48-10.02) | 0.006 | | 3.98 (1.52-10.41) | 0.005 | |
| Ile, His, Trp, Met, Lys, Asn | Qs1 (0-4) | 3 | 9/368 | 5.3 | 1.00 | | 0.08 | 1.00 | | 0.009 | 1.00 | | 0.009 |
| | Qs2 (5-8) | 6 | 13/473 | 5.8 | 1.26 (0.53-2.97) | 0.60 | | 2.01 (0.74-5.42) | 0.17 | | 2.09 (0.77-5.63) | 0.15 | |
| | Qs3 (9-12) | 11 | 15/459 | 6.6 | 1.52 (0.65-3.53) | 0.34 | | 2.71 (1.01-7.24) | 0.05 | | 2.88 (1.07-7.73) | 0.04 | |
| | Qs4 (13-18) | 15 | 18/484 | 7.4 | 2.06 (0.88-4.82) | 0.10 | | 3.36 (1.31-9.72) | 0.01 | | 3.64 (1.33-9.99) | 0.01 | |
| Ile, His, Trp, Met, Lys, Asn, Gln | Qs1 (0-5) | 3 | 10/344 | 6.3 | 1.00 | | 0.19 | 1.00 | | 0.06 | 1.00 | | 0.048 |
| | Qs2 (6-10) | 8 | 14/545 | 5.4 | 0.84 (0.37-1.89) | 0.67 | | 1.20 (0.47-3.04) | 0.70 | | 1.24 (0.49-3.13) | 0.65 | |
| | Qs3 (11-14) | 13 | 13/430 | 6.1 | 1.08 (0.47-2.50) | 0.86 | | 1.69 (0.66-4.36) | 0.28 | | 1.80 (0.70-4.64) | 0.23 | |
| | Qs4 (15-21) | 17 | 18/465 | 7.7 | 1.49 (0.67-3.33) | 0.33 | | 2.21 (0.87-5.61) | 0.10 | | 2.30 (0.90-5.90) | 0.08 | |

TABLE 6-continued

| Amino Acid | Quartiles | Median Value | Onset/ Subject | Incidence (/10³ Pys) | Model 1 HR (95% CI) | p value | p for trend | Model 2 HR (95% CI) | p value | p for trend | Model 3 HR (95% CI) | p value | p for trend |
|---|---|---|---|---|---|---|---|---|---|---|---|---|---|
| Ile, Lys, Gln | Qs1 (0-2) | 1 | 6/353 | 3.6 | 1.00 | | 0.003 | 1.00 | | 0.003 | 1.00 | | 0.002 |
| | Qs2 (3-3) | 3 | 5/264 | 4.0 | 1.01 (0.31-3.31) | 0.99 | | 1.53 (0.41-5.75) | 0.53 | | 1.56 (0.42-5.83) | 0.51 | |
| | Qs3 (4-5) | 4 | 14/566 | 5.1 | 1.50 (0.58-3.93) | 0.41 | | 1.84 (0.58-5.79) | 0.30 | | 2.02 (0.64-6.35) | 0.23 | |
| | Qs4 (6-9) | 7 | 30/601 | 10.2 | 3.10 (1.27-7.56) | 0.01 | | 4.03 (1.39-11.72) | 0.01 | | 4.22 (1.45-12.28) | 0.008 | |

As shown in Table 4, the subjects with higher sum of the amino acid scores of methionine and threonine had a significantly lower risk of developing dementia than the subjects with lower sum of the amino acid scores. As shown in Table 5, the subjects with higher sum of the amino acid scores of essential amino acids, isoleucine, histidine, tryptophan, methionine, lysine, and asparagine, and subjects with higher sum of the amino acid scores of isoleucine, histidine, tryptophan, methionine, lysine, asparagine, and glutamine, and subjects with higher sum of the amino acid scores of isoleucine, lysine, and glutamine had a significantly lower risk of developing Alzheimer-type dementia than the subjects with lower sum of the amino acid scores.

As shown in Table 6, the subjects with higher sum of the amino acid scores of isoleucine, lysine, and glutamine had a significantly higher risk of developing vascular dementia than the subjects with lower sum of the amino acid scores.

Example 2

(Quantitative Analysis of Methionine Metabolic Pathway-Related Substance in Serum)

For the serum samples associated with the present Example, the concentrations of methionine metabolic pathway-related substances were measured. The amino acids to be measured were methionine (Met), S-adenosylmethionine (SAM), S-adenosylhomocysteine (SAH), homocysteine (HCy), cystathionine (Cyst), and cysteine (Cys). As methionine metabolism-related compounds, the concentrations of choline, betaine, and dimethyl glycine (DMG) in serum were measured for reference.

To a tube were added 50 µL of a serum sample (n=3) and 10 µL of an isotope preparation, and then a reductant TCEP (Tris(2-carboxyethyl)phosphine) (50 mg/mL, 50 µL), and the mixture was stirred for 10 seconds with a vortex mixer. To the tube was added 90 µL of 4% sulfosalicylic acid, stirred for 10 seconds on a vortex mixer, and then the mixture was allowed to react for 30 minutes with the tube agitated at 1000 rpm, 4° C. The tube was centrifuged for 10 minutes at 18,000 rpm at 4° C. Agilent 6495 Triple Quadrupole LC/MS system (produced by Agilent Technologies, Inc.) was used as a mass spectrometer to perform mass spectrometry. Poroshell 120 EC-C18 (2.7 µm, 2.1 mm i.d.×100 mm, produced by Agilent Technologies, Inc.) as a column was coupled to the mass spectrometer. As eluents, 5 mM aqueous perfluoroheptanoic acid (PHFA) solution (A solution) and acetonitrile (B solution) were used.

One micro liter of the sample to be measured was applied to the column at a flow rate of 0.4 mL/min. The column temperature was 25° C. The gradient elution conditions were as follows: 5% B solution for 1 minute from the start; then a linear gradient of 5-35% B solution over 2.5 minutes; a linear gradient of 35-40% B solution over 2 minutes; a linear gradient of 40-45% B solution over 1.5 minutes; a linear gradient of 45-95% B solution over 0.5 minutes; 95% B solution for 2 minutes; a linear gradient of 95-5% B solution over 0.5 minutes; and 5% B solution for 3 minutes. Multiple reaction monitoring (MRM) transition is shown in the table below.

TABLE 7

| Compound | MRM transition | New RT |
|---|---|---|
| Ser_n1 | 107.1→61.2 | 1.23 |
| Ser | 106.1→60.2 | 1.23 |
| Gly_c2n1 | 79.1→32.0 | 1.47 |
| Gly | 76.0→30.0 | 1.47 |
| DMG_d6 | 110.1→64.2 | 1.62 |
| DMG | 104.0→58.2 | 1.64 |
| Cys_c3n1 | 126.1→61.2 | 1.53 |
| Cys | 122.0→59.2 | 1.53 |
| Betaine | 118.1→58.3 | 1.96 |
| HCys_d4 | 140.1→94.1 | 3.30 |
| HCys | 136.0→90.0 | 3.30 |
| Met_d3 | 153.1→107.1 | 4.10 |
| Met | 150.1→104.0 | 4.10 |
| Choline + d9 | 113.2→69.2 | 4.12 |
| Choline+ | 104.1→60.3 | 4.12 |
| Cyst_d4 | 227.1→137.9 | 5.35 |
| Cyst | 223.0→134.0 | 5.35 |
| SAH | 385.1→136.0 | 5.84 |
| SAH_d4 | 389.2→138.0 | 5.84 |
| SAM_d3 | 402.2→250.1 | 5.91 |
| SAM | 399.2→250.2 | 5.91 |

As in Example 1, the concentration of each amino acid in the serum sample was determined from measurement data, and then the subjects were divided into four quartiles according to the quartiles for the concentration of the amino acid. The four quartiles were defined as Q1, Q2, Q3, and Q4, from low to high ranges of the concentration of the amino acid. In addition, the ratio of the concentration of Met to the concentration of HCy in the serum sample (Met/HCy), and the ratio of the concentration of SAM to the concentration of SAH in the serum sample (SAM/SAH) were calculated, and then the subjects were divided into four quartiles according to the quartiles for the value. The four quartiles were defined as Q1, Q2, Q3, and Q4, from low to high ranges of the value.

(Statistical Analysis)

For Q1 to Q4, the HR and the 95% CI were determined using Cox proportional hazards model. Analysis was performed using the following model: model 1, including age and gender as baseline covariates; or model 2, including age, gender, education level, hypertension, diabetes mellitus, serum total cholesterol, estimated glomerular filtration rate, BMI, past history of stroke, habit of smoking, habit of drinking, routine exercise, and serum albumin concentration as baseline covariates. All statistical analyses were performed using SAS 9.4 (produced by SAS Institute Inc.). A two-sided test with p<0.05 was considered statistically significant. The glomerular filtration rate was estimated according to the Chronic Kidney Disease Epidemiology Collaboration formula.

(Results)

For each measured amino acid, and Met/HCy, and SAM/SAH, the hazard rates of Q2-Q4 to Q1 are shown in Table 8.

TABLE 8

|  | Dementia | | | | Alzheimer-type dementia | | | |
|---|---|---|---|---|---|---|---|---|
|  | Q2 | Q3 | Q4 | P for trend | Q2 | Q3 | Q4 | P for trend |
| Hcy | | | | | | | | |
| Model 1 | 1.37 (0.87-2.15) | 1.32 (0.83-2.05) | 1.78 (1.14-2.78) | 0.01 | 1.46 (0.86-2.46) | 1.38 (0.81-2.34) | 1.40 (0.82-2.40) | 0.38 |
| Model 2 | 1.38 (0.88-2.18) | 1.30 (0.82-2.06) | 1.71 (1.07-2.72) | 0.04 | 1.47 (0.87-2.49) | 1.40 (0.82-2.40) | 1.47 (0.84-2.59) | 0.29 |
| Met | | | | | | | | |
| Model 1 | 1.08 (0.77-1.52) | 0.81 (0.56-1.18) | 0.72 (0.47-1.11) | 0.07 | 1.16 (0.77-1.75) | 0.82 (0.52-1.29) | 0.76 (0.45-1.27) | 0.17 |
| Model 2 | 1.14 (0.80-1.62) | 0.83 (0.57-1.20) | 0.75 (0.49-1.14) | 0.09 | 1.20 (0.80-1.82) | 0.81 (0.51-1.27) | 0.74 (0.44-1.25) | 0.13 |
| Cyst | | | | | | | | |
| Model 1 | 1.05 (0.68-1.62) | 1.14 (0.74-1.74) | 1.48 (0.99-2.23) | 0.03 | 0.82 (0.50-1.35) | 0.99 (0.61-1.61) | 1.10 (0.68-1.76 | 0.47 |
| Model 2 | 1.00 (0.65-1.55) | 1.12 (0.73-1.73) | 1.41 (0.91-2.18) | 0.08 | 0.82 (0.50-1.36) | 1.01 (0.62-1.65) | 1.14 (0.69-1.89) | 0.42 |
| Cys | | | | | | | | |
| Model 1 | 1.14 (0.72-1.79) | 1.24 (0.81-1.91) | 1.03 (0.67-1.59) | 0.99 | 1.00 (0.58-1.74) | 1.13 (0.68-1.89) | 0.98 (0.59-1.64) | 0.97 |
| Model 2 | 1.17 (074-1.86) | 1.19 (0.76-1.86) | 0.97 (0.60-1.55) | 0.71 | 1.01 (0.58-1.77) | 1.07 (0.62-1.83) | 0.93 (0.53-1.64) | 0.79 |
| SAM | | | | | | | | |
| Model 1 | 0.96 (0.66-1.39) | 0.84 (0.58-1.21) | 0.74 (0.51-1.10) | 0.1 | 0.92 (0.60-1.42) | 0.71 (0.46-1.11) | 0.67 (0.46-1.07) | 0.05 |
| Model 2 | 0.89 (0.61-1.29) | 0.77 (0.53-1.13) | 0.66 (0.44-1.00) | 0.04 | 0.86 (0.56-1.33) | 0.63 (0.40-1.01) | 0.57 (0.35-0.95 | 0.01 |
| SAH | | | | | | | | |
| Model 1 | 0.97 (0.62-1.52) | 1.27 (0.83-1.95) | 1.37 (0.90-2.10) | 0.06 | 1.16 (0.69-1.94) | 1.35 (0.81-2.24) | 1.21 (0.72-2.04) | 0.44 |
| Model 2 | 0.94 (0.60-1.47) | 1.25 (0.81-1.94) | 1.21 (0.76-1.95) | 0.24 | 1.13 (0.67-1.90) | 1.30 (0.77-2.19) | 1.15 (0.64-2.06 | 0.57 |
| Betaine | | | | | | | | |
| Model 1 | 0.79 (0.54-1.15) | 0.81 (0.56-1.18) | 0.94 (0.66-1.35) | 0.82 | 0.84 (0.53-1.33) | 0.91 (0.58-1.42) | 0.95 (0.61-1.48) | 0.92 |
| Model 2 | 0.74 (0.50-1.09) | 0.82 (0.56-1.20) | 0.89 (0.62-1.29) | 0.72 | 0.80 (0.50-1.27) | 0.90 (0.57-1.42) | 0.92 (0.58-1.44) | 0.86 |
| DMG | | | | | | | | |
| Model 1 | 1.38 (0.93-2.25) | 0.84 (0.55-1.29) | 1.24 (0.83-1.84) | 0.84 | 1.24 (0.79-1.93) | 0.55 (0.33-0.94) | 1.02 (0.64-1.61) | 0.39 |
| Model 2 | 1.35 (0.91-2.00) | 0.78 (0.50-1.20) | 1.15 (0.76-1.74) | 0.87 | 1.22 (0.78-1.91) | 0.52 (0.30-0.89) | 0.99 (0.61-1.59) | 0.35 |
| Choline | | | | | | | | |
| Model 1 | 1.12 (0.76-1.65) | 0.94 (0.63-1.40) | 1.48 (1.03-2.14) | 0.07 | 1.27 (0.80-2.02) | 1.00 (0.62-1.62) | 1.48 (0.95-2.31) | 0.17 |
| Model 2 | 1.14 (0.77-1.69) | 0.94 (0.63-1.41) | 1.46 (1.00-2.12) | 0.09 | 1.37 (0.85-2.19) | 1.03 (0.63-1.68) | 1.50 (0.95-2.37) | 0.19 |
| Met/Hcy | | | | | | | | |
| Model 1 | 1.54 (1.02-2.31) | 1.44 (0.95-2.20) | 1.11 (0.70-1.76) | 0.02 | 1.37 (0.83-2.27) | 1.51 (0.91-2.51) | 1.26 (0.74-2.17) | 0.22 |
| Model 2 | 1.42 (0.92-2.18) | 1.44 (0.94-2.20) | 1.10 (0.69-1.75) | 0.06 | 1.43 (0.84-2.41) | 1.58 (0.95-2.64) | 1.28 (0.74-2.22) | 0.16 |
| SAM/SAH | | | | | | | | |
| Model 1 | 0.58 (0.40-0.83) | 058 (0.40-0.84) | 0.65 (0.45-94) | 0.02 | 0.69 (0.46-1.05) | 0.54 (0.34-0.87) | 0.67 (0.43-1.05) | 0.04 |
| Model 2 | 0.59 (0.41-0.84) | 0.59 (0.41-0.87) | 0.65 (0.44-0.96) | 0.03 | 0.64 (0.42-0.99) | 0.52 (0.32-0.84) | 0.61 (0.38-0.99) | 0.02 |

TABLE 8-continued

| | Vascular dementia | | | |
|---|---|---|---|---|
| | Q2 | Q3 | Q4 | P for trend |
| Hcy | | | | |
| Model 1 | 1.12 (0.39-3.18) | 1.36 (0.50-3.69) | 2.63 (1.03-6.72) | 0.01 |
| Model 2 | 1.20 (0.42-3.43) | 1.34 (0.49-3.68) | 1.99 (0.74-5.33) | 0.12 |
| Met | | | | |
| Model 1 | 0.94 (0.45-1.97) | 0.88 (0.42-1.84) | 0.62 (0.27-1.47) | 0.3 |
| Model 2 | 1.20 (0.56-2.56) | 1.05 (0.49-2.23) | 0.87 (0.37-2.04) | 0.73 |
| Cyst | | | | |
| Model 1 | 2.94 (0.97-8.92) | 1.71 (0.52-5.62) | 4.21 (1.43-12.4) | 0.01 |
| Model 2 | 2.51 (0.82-7.67) | 1.55 (0.46-5.19) | 3.04 (0.97-9.47) | 0.11 |
| Cys | | | | |
| Model 1 | 2.37 (0.85-6.61) | 1.83 (0.65-5.11) | 1.92 (0.70-5.28) | 0.47 |
| Model 2 | 2.99 (1.05-8.52) | 1.94 (0.67-5.62) | 2.08 (0.69-6.24) | 0.51 |
| SAM | | | | |
| Model 1 | 0.89 (0.42-1.86) | 0.92 (0.45-1.88) | 0.50 (0.22-1.17) | 0.15 |
| Model 2 | 0.72 (0.34-1.55) | 0.97 (0.46-2.04) | 0.49 (0.20-1.20) | 0.24 |
| SAH | | | | |
| Model 1 | 1.39 (0.46-4.20) | 1.83 (0.64-5.28) | 3.20 (1.17-8.79) | 0.006 |
| Model 2 | 1.30 (0.43-3.91) | 1.89 (0.64-5.55) | 2.39 (0.81-7.08) | 0.07 |
| Betaine | | | | |
| Model 1 | 1.15 (0.53-2.48) | 0.55 (0.22-1.40) | 1.41 (0.69-2.89) | 0.55 |
| Model 2 | 1.09 (0.50-2.69) | 0.59 (0.23-1.52) | 1.29 (0.61-2.73) | 0.68 |
| DMG | | | | |
| Model 1 | 1.91 (0.73-5.01) | 1.61 (0.61-4.26) | 2.32 (0.91-5.89) | 0.12 |
| Model 2 | 1.75 (0.66-4.64) | 1.30 (0.48-3.52) | 1.89 (0.72-4.98) | 0.31 |
| Choline | | | | |
| Model 1 | 0.97 (0.45-2.10) | 0.90 (0.46-2.13) | 1.22 (0.58-2.56) | 0.6 |
| Model 2 | 0.81 (0.36-1.78) | 0.95 (0.43-2.07) | 1.05 (0.49-2.25) | 0.78 |
| Met/Hcy | | | | |
| Model 1 | 1.50 (0.68-3.34) | 1.37 (0.60-3.15) | 0.86 (0.33-2.23) | 0.19 |
| Model 2 | 0.92 (0.39-2.15) | 1.18 (0.51-2.75) | 0.80 (0.30-2.09) | 0.98 |
| SAM/SAH | | | | |
| Model 1 | 021 (0.09-0.52) | 0.44 (0.22-0.89) | 0.42 (0.20-0.87) | 0.02 |
| Model 2 | 0.27 (0.11-0.68) | 0.55 (0.26-1.14) | 0.54 (0.24-1.20) | 0.14 |

As shown in Table 8, the subjects with higher concentration of SAM in serum or SAM/SAH had a significantly lower risk of developing dementia than the subjects with lower concentration or SAM/SAH. The subjects with higher concentration of homocysteine or cystathionine in serum or Met/HCy had a significantly higher risk of developing dementia than the subject with lower concentration or Met/HCy. In addition, the subjects with higher concentration of SAH in serum tended to have a higher risk of developing dementia than the subjects with lower concentration.

The subjects with higher concentration of SAM in serum or SAM/SAH had a significantly lower risk of developing Alzheimer-type dementia than the subjects with lower concentration or SAM/SAH. The subjects with higher concentration of homocysteine, cystathionine, or SAH in serum had a significantly higher risk of developing vascular dementia than the subject with lower concentration. The subjects with higher SAM/SAH had a significantly lower risk of developing vascular dementia than the subjects with lower SAM/SAH.

The disease risk assessment program 11 and the software programs described above can be stored in a computer-readable recording medium, such as a compact disc read only memory (CD-ROM), a digital versatile disc (DVD), a magneto-optical disc (MO disk), a universal serial bus (USB) memory, a memory card, or an HDD for distribution. The disease risk assessment program 11 and the software programs can be installed on a specified or general-purpose computer to allow the computer to function as the disease risk assessment apparatus 100 or the disease risk assessment apparatus 200. Further, the disease risk assessment program 11 and the software programs can be stored in a storage of another server on the Internet, and the disease risk assessment program 11 and the software programs can be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-203803, filed on Oct. 30, 2018, the entire disclosure of which is incorporated by reference herein.

INDUSTRIAL APPLICABILITY

The present disclosure is useful in assessment or prediction of the risk of developing dementia, and in assessment or prediction of susceptibility to dementia in future.

REFERENCE SIGNS LIST

1 Assessment unit,
2 Output unit,
10 Storage,
11 Disease risk assessment program,
20 RAM,
30 Input device,
40 Display,
50 CPU,
60 Bus,
100 and 200 Disease risk assessment apparatus

The invention claimed is:

1. A method of inhibiting development of dementia, comprising:
   a. obtaining a blood sample from a subject;
   b. measuring concentrations of amino acids in the blood sample and inputting the concentrations into a computer program which comprises an assessment process and is stored in an assessment unit of a disease risk assessment apparatus;
   c. measuring risk of developing dementia in future in the subject using the disease risk assessment apparatus, the measuring being based on comparison between a first ratio and a first reference value and comparison between a second ratio and a second reference value, wherein the first ratio is a concentration ratio of S-adenosylmethionine to S-adenosylhomocysteine in the blood sample and the second ratio is a concentration ratio of methionine to homocysteine in the blood sample;
   d-1. in response to measuring the subject as having the first ratio lower than the first reference value, administering a dementia preventive agent containing S-adenosylmethionine to the subject to inhibit development of dementia in the subject; and
   d-2. in response to measuring the subject as having the second ratio lower than the second reference value, administering a dementia preventive agent containing methionine to the subject to inhibit development of dementia in the subject.

2. The method of claim 1, wherein the dementia is Alzheimer-type dementia or vascular dementia.

3. The method of claim 1, wherein the risk of developing dementia in future in the subject is the risk of developing dementia within five years after collection of the blood sample.

4. A method of inhibiting development of dementia, comprising:
   a. obtaining a blood sample from a subject;
   b. measuring concentrations of amino acids in the blood sample;
   c. measuring risk of developing dementia in future in the subject, the measuring being based on comparison between a first ratio and a first reference value and comparison between a second ratio and a second reference value, wherein the first ratio is a concentration ratio of S-adenosylmethionine to S-adenosylhomocysteine in the blood sample of the subject and the second ratio is a concentration ratio of methionine to homocysteine in the blood sample;
   d-1. in response to measuring the subject as having the first ratio lower than the first reference value, administering a dementia preventive agent containing S-adenosylmethionine to the subject to inhibit development of dementia in the subject; and
   d-2. in response to measuring the subject as having the second ratio lower than the second reference value, administering a dementia preventive agent containing methionine to the subject to inhibit development of dementia in the subject.

5. The method of claim 4, wherein the dementia is Alzheimer-type dementia or vascular dementia.

6. The method of claim 4, wherein the risk of developing dementia in future in the subject is the risk of developing dementia within five years after collection of the blood sample.

* * * * *